(12) United States Patent
Miwa et al.

(10) Patent No.: US 11,469,623 B2
(45) Date of Patent: *Oct. 11, 2022

(54) POWER RECEIVER, POWER TRANSMITTER, POWER TRANSCEIVER, AND POWER TRANSMISSION SYSTEM

(71) Applicant: KYOCERA Corporation, Kyoto (JP)

(72) Inventors: Tomoaki Miwa, Fujisawa (JP); Atsuhiko Kanda, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/399,994

(22) Filed: Aug. 11, 2021

(65) Prior Publication Data

US 2021/0376665 A1 Dec. 2, 2021

Related U.S. Application Data

(63) Continuation of application No. 16/341,859, filed as application No. PCT/JP2017/035881 on Oct. 2, 2017, now Pat. No. 11,121,584.

(30) Foreign Application Priority Data

Oct. 14, 2016 (JP) .............................. JP2016-202941
Oct. 14, 2016 (JP) .............................. JP2016-202957
Oct. 14, 2016 (JP) .............................. JP2016-202961

(51) Int. Cl.
*H02J 50/50* (2016.01)
*H02J 50/80* (2016.01)
*H02J 50/20* (2016.01)

(52) U.S. Cl.
CPC .............. *H02J 50/50* (2016.02); *H02J 50/20* (2016.02); *H02J 50/80* (2016.02)

(58) Field of Classification Search
None
See application file for complete search history.

(56) References Cited

U.S. PATENT DOCUMENTS

| | | |
|---|---|---|
| 8,159,364 B2 | 4/2012 | Zeine |
| 8,180,286 B2 | 5/2012 | Yamasuge |
| 8,390,249 B2 | 3/2013 | Walley et al. |
| 8,410,953 B2 | 4/2013 | Zeine |
| 8,427,101 B2 | 4/2013 | Saunamaki |
| 8,471,525 B2 | 6/2013 | Kim et al. |
| 8,558,661 B2 | 10/2013 | Zeine |
| 8,854,176 B2 | 10/2014 | Zeine |
| 9,142,973 B2 | 9/2015 | Zeine |
| 9,530,555 B2 | 12/2016 | Teggatz et al. |
| 9,979,439 B2 | 5/2018 | Kwon et al. |
| 9,997,040 B2 * | 6/2018 | Corum .................... H02J 50/80 |
| 10,008,887 B2 | 6/2018 | Zeine |
| 10,141,785 B2 | 11/2018 | Son et al. |

(Continued)

FOREIGN PATENT DOCUMENTS

| | | |
|---|---|---|
| JP | 2013-226022 A | 10/2013 |
| JP | 2014-223018 A | 11/2014 |
| JP | 2015-130748 A | 7/2015 |

*Primary Examiner* — Thomas J. Hiltunen
(74) *Attorney, Agent, or Firm* — Studebaker & Brackett PC

(57) ABSTRACT

A power receiver includes a power reception interface that receives wireless power and a controller that transmits an emergency power transmission request for the wireless power during an emergency.

18 Claims, 18 Drawing Sheets

(56) References Cited

U.S. PATENT DOCUMENTS

| | | |
|---|---|---|
| 10,256,670 B2 | 4/2019 | Zeine et al. |
| 10,291,066 B1 | 5/2019 | Leabman et al. |
| 10,367,374 B2 | 7/2019 | Tole et al. |
| 11,121,584 B2 * | 9/2021 | Miwa .................... H02J 50/40 |
| 2005/0134213 A1 | 6/2005 | Takagi et al. |
| 2010/0315045 A1 | 12/2010 | Zeine |
| 2012/0193999 A1 | 8/2012 | Zeine |
| 2013/0207604 A1 | 8/2013 | Zeine |
| 2014/0035524 A1 | 2/2014 | Zeine |
| 2015/0022022 A1 | 1/2015 | Zeine |
| 2016/0013685 A1 | 1/2016 | Zeine |
| 2016/0211694 A1 | 7/2016 | Wang et al. |
| 2017/0358959 A1 | 12/2017 | Zeine |

* cited by examiner

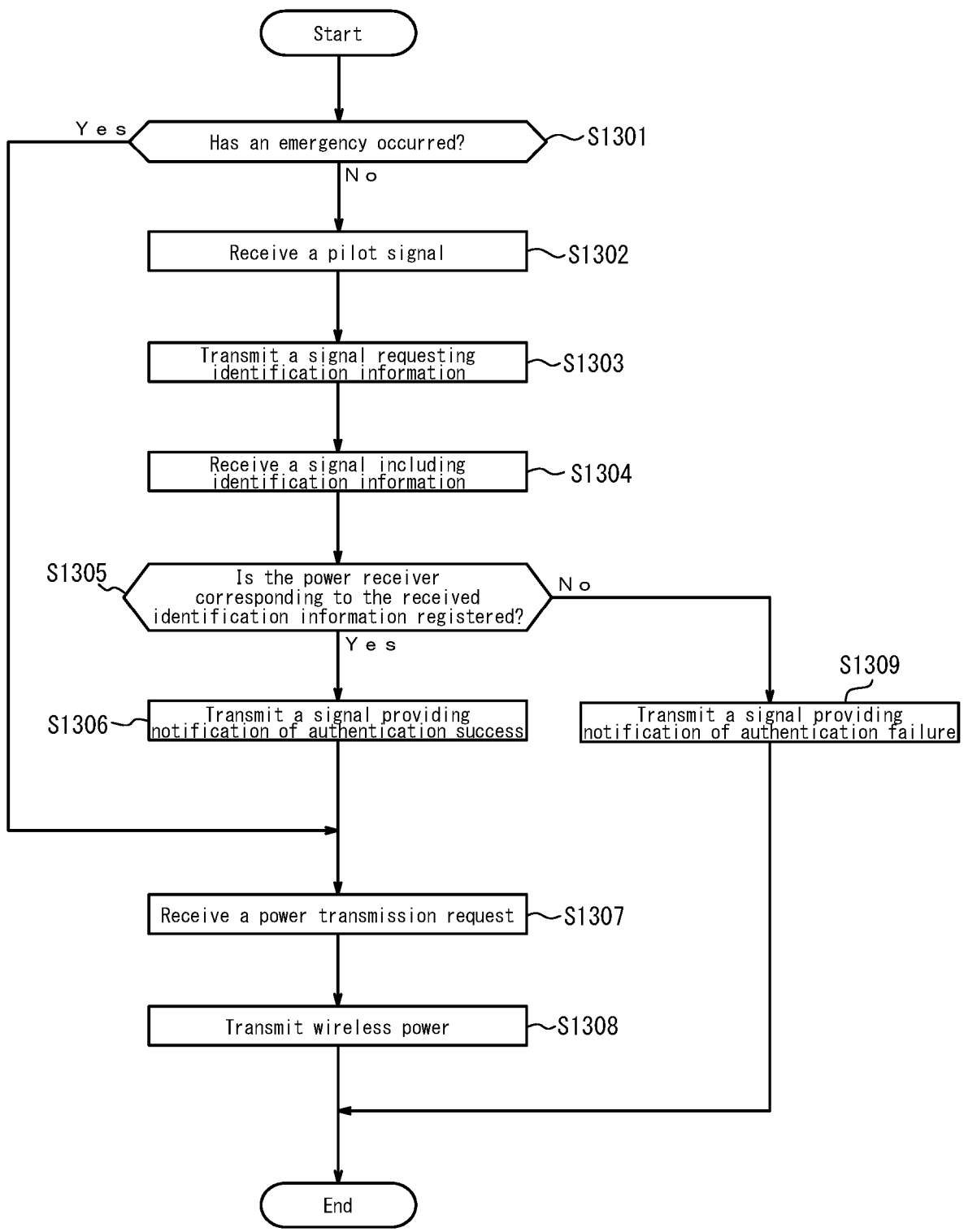

POWER RECEIVER, POWER TRANSMITTER, POWER TRANSCEIVER, AND POWER TRANSMISSION SYSTEM

CROSS-REFERENCE TO RELATED APPLICATIONS

This present application is a Continuation of U.S. patent application Ser. No. 16/341,859, filed on Apr. 12, 2019, which is the U.S. National Phase of International Application No. PCT/JP2017/035881 filed on Oct. 2, 2017, which claims priority to and the benefit of Japanese Patent Application No. 2016-202941 filed Oct. 14, 2016, Japanese Patent Application No. 2016-202957 filed Oct. 14, 2016, and Japanese Patent Application No. 2016-202961 filed Oct. 14, 2016, the entire contents of which are incorporated herein by reference.

TECHNICAL FIELD

The present disclosure relates to a power receiver, a power transmitter, a power transceiver, and a power transmission system.

BACKGROUND

A method for using electromagnetic waves to supply power to an electronic device is known. For example, a power transmitter is known that uses microwaves to supply power to a device.

SUMMARY

A power receiver according to an embodiment includes a power reception interface configured to receive wireless power and a controller configured to transmit an emergency power transmission request for the wireless power during an emergency.

A power transceiver according to an embodiment includes a power reception interface configured to receive wireless power and a power transmission interface configured to transmit wireless power. The power transmission interface is configured to transmit wireless power to a power receiver during an emergency.

A power transmission system according to an embodiment includes a power receiver and a power transceiver. The power receiver is configured to transmit an emergency power transmission request for wireless power during an emergency. The power transceiver is configured to receive wireless power when not receiving the emergency power transmission request and to transmit wireless power to the power receiver when receiving the emergency power transmission request.

A power transceiver according to an embodiment includes a power reception interface configured to receive wireless power, a power transmission interface configured to transmit wireless power, and a controller configured to control transmission and reception of wireless power. The controller is configured to transmit a power transmission request for wireless power during an emergency. The power reception interface is configured to receive wireless power transmitted in response to the power transmission request. The power transmission interface is configured to transmit wireless power to a power receiver during an emergency.

A power receiver according to an embodiment includes a power reception interface and a controller. The power reception interface is configured to receive wireless power. The controller is configured, during normal circumstances, to transmit a power transmission request for wireless power and to receive, in the power reception interface, wireless power transmitted from a power transmitter in response to the power transmission request. During an emergency, the controller is configured to transmit an emergency power transmission request for wireless power and to receive power transmitted from a power transceiver to another power transceiver different from the power transceiver in response to the emergency power transmission request. The controller receives the power from the another power transceiver in the power reception interface.

A power transmission system according to an embodiment includes a power receiver capable of receiving wireless power and a power transceiver capable of transmitting and receiving wireless power. The power receiver is configured to transmit an emergency power transmission request for wireless power during an emergency. When receiving the emergency power transmission request, the power transceiver is configured to receive wireless power from a power transmitter capable of transmitting wireless power and to transmit the received wireless power to the power receiver.

A power transmitter according to an embodiment includes a power transmission interface, a memory, and a controller. The power transmission interface is configured to transmit wireless power. The memory is configured to store information related to a power receiver. The controller is configured to transmit wireless power from the power transmission interface in response to a power transmission request received from a power receiver for which the information is stored in the memory during normal circumstances. The controller is configured to transmit wireless power from the power transmission interface in response to a power transmission request received from a power receiver for which the information is stored in the memory and from a power receiver for which the information is not stored in the memory during an emergency.

A power receiver according to an embodiment includes a power reception interface and a controller. The power reception interface is configured to receive wireless power. The controller is configured to receive wireless power from a power transmitter in the power reception interface during normal circumstances, information related to the power receiver being registered in the power transmitter. During an emergency, the controller is configured to receive wireless power, in the power reception interface, from the power transmitter in which the information related to the power receiver is registered and from a power transmitter in which the information related to the power receiver is not registered.

A power transmission system according to an embodiment includes a power transmitter capable of transmitting wireless power and a power receiver capable of receiving wireless power. The power transmitter is configured to store information related to a power receiver, to transmit wireless power, during normal circumstances, in response to a power transmission request received from a power receiver for which the information is stored, and to transmit wireless power, during an emergency, in response to a power transmission request received from a power receiver for which the information is stored and from a power receiver for which the information is not stored.

BRIEF DESCRIPTION OF THE DRAWINGS

In the accompanying drawings:

FIG. 19 is a flowchart illustrating an example of processing executed by the power transmitter in FIG. 15.

DETAILED DESCRIPTION

During an emergency, such as when a disaster occurs, it may be useful to supply power by a different method than during normal circumstances. The power receiver, power transceiver, and power transmission system according to the present disclosure can be more useful.

Embodiments of the present disclosure are now described with reference to the drawings.

First Embodiment

Figure 1:
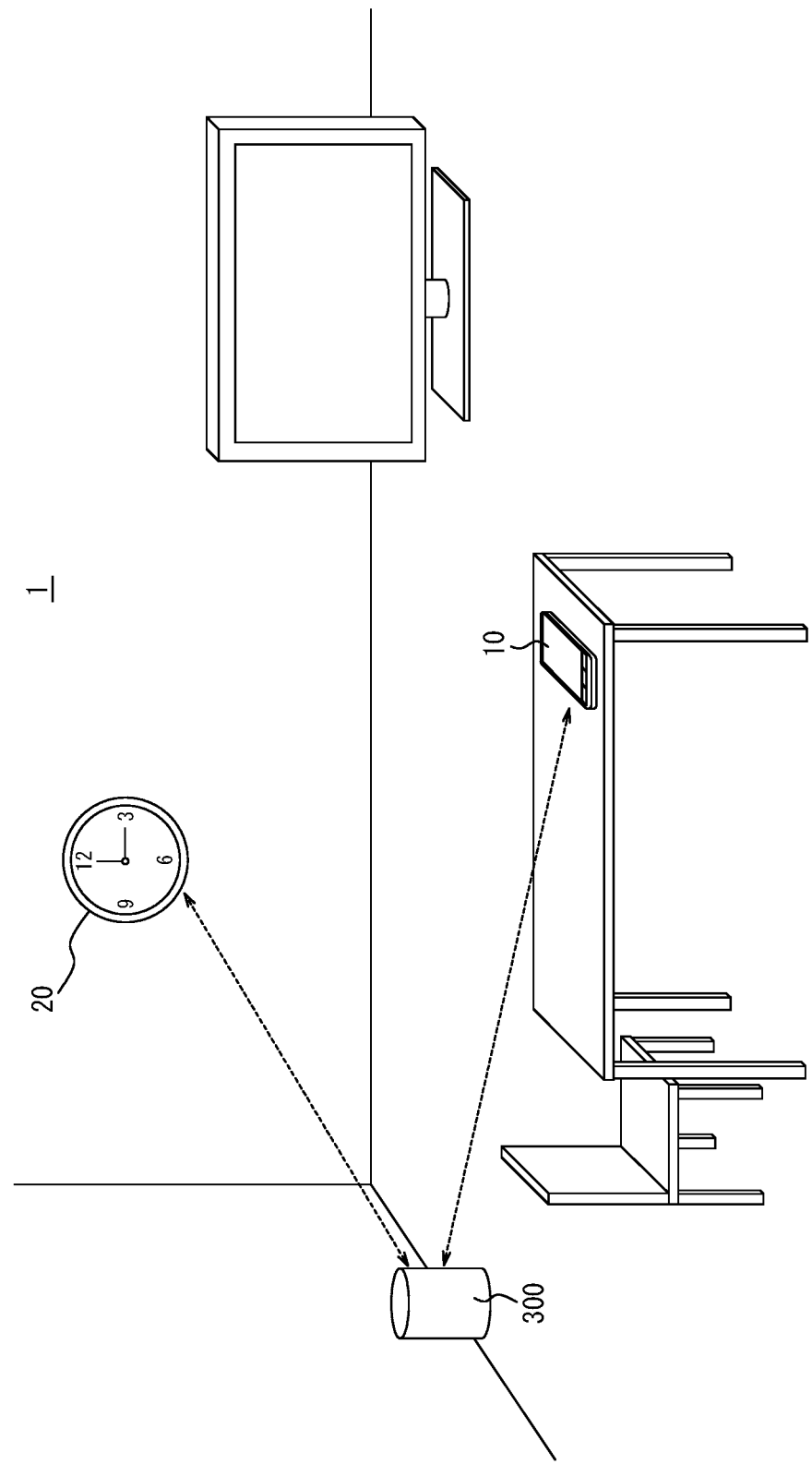
FIG. 1 illustrates the schematic configuration of a power transmission system according to a first embodiment.

FIG. 1 illustrates the schematic configuration of a power transmission system 1 according to a first embodiment. The power transmission system 1 includes a plurality of electronic devices and a power transmitter 300. FIG. 1 depicts a mobile phone 10 and a clock (wall-hanging clock) 20 as examples of the plurality of electronic devices.

The plurality of electronic devices each house a power receiver or a power transceiver therein. In the present embodiment, the mobile phone 10 houses a power receiver. In the present embodiment, the clock 20 houses a power transceiver. Each electronic device may, for example, include a battery holder housing a power receiver or a power transceiver shaped to be housable in the battery holder. In this case, the power receiver or power transceiver may be shaped to appear like a dry cell battery, a button cell battery, or the like.

Each electronic device is driven by the power supplied from the power receiver or power transceiver housed therein. FIG. 1 illustrates the mobile phone 10 and the clock 20 as examples of electronic devices. The electronic devices are not, however, limited to the examples in FIG. 1 and may be any electronic device capable of being driven by a power receiver or a power transceiver. Examples of such electronic devices include a radio, a remote control, a mouse, and an electronic dictionary.

Figure 2:
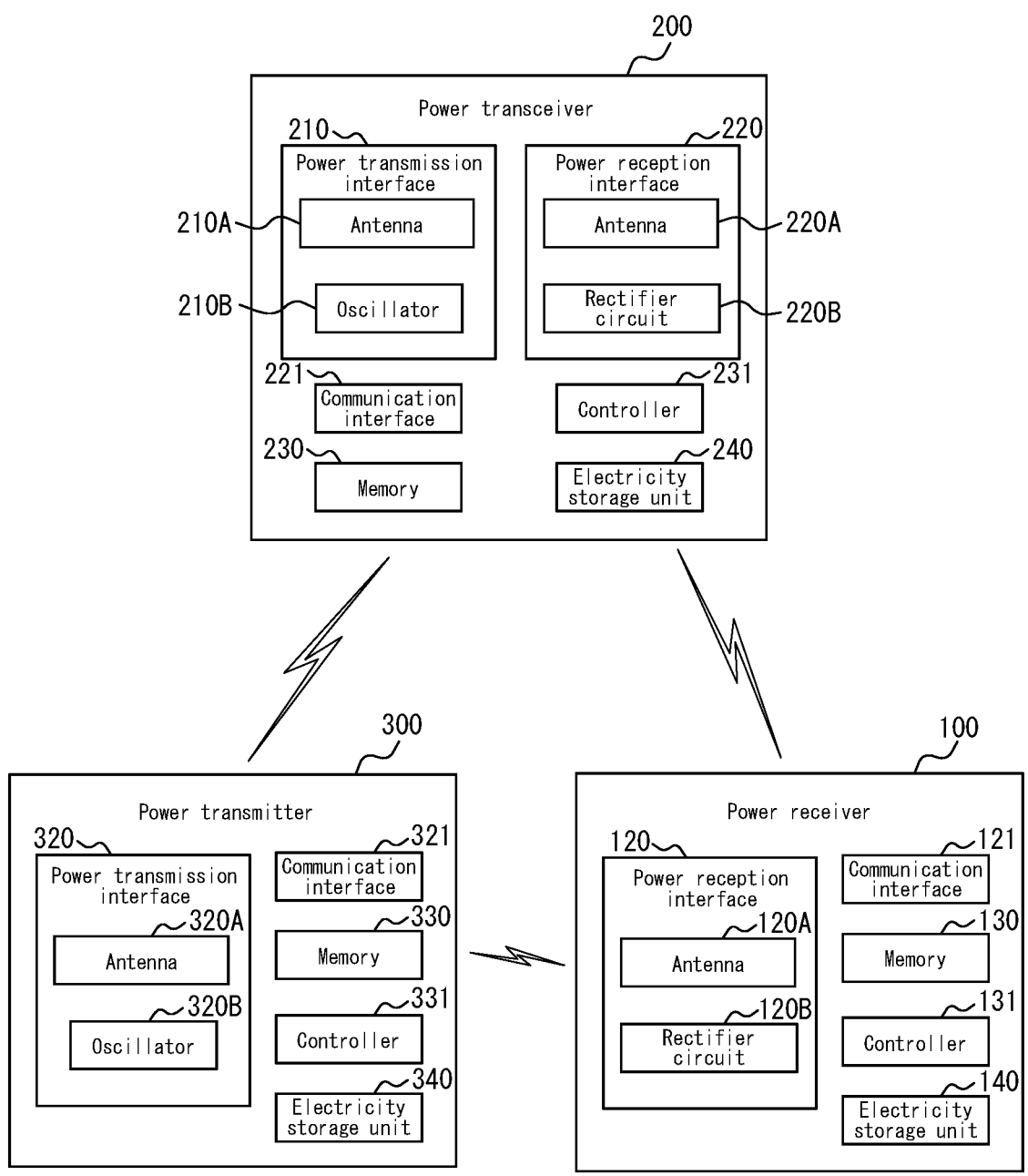
FIG. 2 is a functional block diagram illustrating the schematic configuration of the power transmission system in FIG. 1.

FIG. 2 is a functional block diagram illustrating the schematic configuration of the power transmission system 1. The power transmission system 1 includes a power receiver 100, a power transceiver 200, and a power transmitter 300. While details are provided below, the power transceiver 200 has both the power reception function of a power receiver and the power transmission function of a power transmitter. The power transceiver 200 functions as either a power receiver or a power transmitter in accordance with predetermined conditions. For the sake of explanation, only one each of the power receiver 100, the power transceiver 200, and the power transmitter 300 are illustrated, but the power transmission system 1 may include a plurality of each of the power receiver 100, the power transceiver 200, and the power transmitter 300.

The power receiver 100 receives wireless power from the power transmitter 300. The power receiver 100 receives wireless power from the power transceiver 200 functioning as a power transmitter. Specifically, the power receiver 100 receives electromagnetic waves for power supply from the power transmitter 300. The power receiver 100 receives electromagnetic waves for power supply from the power transceiver 200 functioning as a transmitter. The power receiver 100 converts the received electromagnetic waves into direct current (DC) power. The power receiver 100 thus receives wireless power.

The power receiver 100 supplies the received power to the electronic device housing the power receiver 100 (here, the mobile phone 10). The power receiver 100 includes a positive electrode terminal and a negative electrode terminal. The positive electrode terminal connects to the terminal on the positive electrode side of the electronic device. The negative electrode terminal connects to the terminal on the negative electrode side of the electronic device. The power receiver 100 supplies power (electricity) to the electronic device through the positive electrode terminal and the negative electrode terminal.

The power receiver 100 includes a power reception interface 120, a communication interface 121, a memory 130, a controller 131, and an electricity storage unit 140.

The power reception interface 120 receives wireless power. Specifically, the power reception interface 120 receives wireless power by generating electricity, in response to control by the controller 131, using the electromagnetic waves received from the outside. The power reception interface 120 supplies the generated electricity to the electronic device through the positive electrode terminal and the negative electrode terminal. The potential difference between the positive electrode terminal and the negative electrode terminal may, for example, be a potential difference corresponding to the electronic device to which power is supplied.

The power reception interface 120 includes an antenna 120A and a rectifier circuit 120B. The antenna 120A receives electromagnetic waves from the power transmitter 300 or the power transceiver 200 functioning as a power transmitter. The rectifier circuit 120B converts the electromagnetic waves received by the antenna 120A into DC power. The rectifier circuit 120B supplies the converted DC power to the electronic device through the positive electrode terminal and the negative electrode terminal.

In response to control by the controller 131, the communication interface 121 communicates wirelessly with an external device. For example, the communication interface 121 communicates with the power transmitter 300 and the power transceiver 200. The communication interface 121 may communicate with the mobile phone 10 that houses the power receiver 100. The power receiver 100 may communicate wirelessly using the antenna 120A instead of the communication interface 121. The communication interface 121 transmits a power transmission request to request transmission of power during normal circumstances and transmits an emergency power transmission request to request power transmission during an emergency. Details on the power transmission request and the emergency power transmission request are provided below.

The memory 130 can be configured by a semiconductor memory, a magnetic memory, or the like. The memory 130 stores various information and/or programs for operating the power receiver 100. The memory 130 may also function as a working memory.

The controller 131 is a processor that controls and manages the power receiver 100 overall, starting with the functional blocks of the power receiver 100. The controller 131 is a processor, such as a central processing unit (CPU), that executes programs with prescribed control procedures or is a dedicated processor specialized for the processing of each function.

The electricity storage unit 140 is electrically connected to the positive electrode terminal and the negative electrode terminal of the power receiver 100 and is electrically connected to the power reception interface 120. The electricity storage unit 140 can store electricity, from among the power received by the power reception interface 120, that is not supplied to the electronic device (surplus electricity). The electricity stored by the electricity storage unit 140 may, for example, be supplied to the electronic device through the positive electrode terminal and the negative electrode terminal when the power receiver 100 cannot receive wireless power from the power transmitter 300 and the power transceiver 200.

The power transmitter 300 may be a home gateway, a wireless power transmission system, or the like and is installed indoors, for example. The power transmitter 300 transmits wireless power to the power receiver 100 and the power transceiver 200. Specifically, the power transmitter 300 generates electromagnetic waves for power supply. The power transmitter 300 transmits the generated electromagnetic waves to the power receiver 100 or power transceiver 200 in an electronic device installed in the same building, for example. In the example in FIG. 1, the power transmitter 300 transmits electromagnetic waves to the power receiver 100 in the mobile phone 10 and to the power transceiver 200 in the clock 20.

The power transmitter 300 may perform authentication with the power receiver 100 and the power transceiver 200 and transmit electromagnetic waves for power supply only to the power receiver 100 and the power transceiver 200 for which authentication is successful. This can prevent the power transmitter 300 from supplying power to the power receiver or power transceiver mounted in an unintended electronic device (such as an electronic device in a neighboring house).

Authentication processing is now described. First, the power transmitter 300 receives a pilot signal requesting authentication from the power receiver 100 or the power transceiver 200. The power transmitter 300 then transmits a signal requesting identification information to the power receiver 100 or the power transceiver 200. When receiving the signal requesting identification information from the power transmitter 300, the power receiver 100 or the power transceiver 200 transmits a signal including the identification information of the power receiver 100 or the power transceiver 200 to the power transmitter 300. When acquiring the signal including the identification information of the power receiver 100 or the power transceiver 200 from the power receiver 100 or the power transceiver 200, the power transmitter 300 determines whether the identification information of the power receiver 100 or the power transceiver 200 has been authenticated. The power transmitter 300 transmits a signal providing notification of authentication success to the power receiver 100 or the power transceiver 200 when the power transmitter 300 determines that the identification information of the power receiver 100 or the power transceiver 200 has been authenticated. Authentication is performed in this way between the power transmitter 300 and the power receiver 100 or power transceiver 200. Authentication may also be performed between the power receiver 100 and the power transceiver 200.

The power transmitter 300 may transmit electromagnetic waves for power supply to the power receiver 100 and the power transceiver 200 without performing authentication with the power receiver 100 and the power transceiver 200. This allows the power transmitter 300 to be installed in a public location and supply power to any electronic device.

The power transmitter 300 includes a power transmission interface 320, a communication interface 321, a memory 330, a controller 331, and an electricity storage unit 340.

The power transmission interface 320 transmits wireless power. Specifically, the power transmission interface 320 transmits wireless power by outputting electricity supplied from a power source, such as power distribution equipment, as electromagnetic waves in response to control by the controller 331.

The power transmission interface 320 includes an antenna 320A and an oscillator 320B. The oscillator 320B transmits wireless power by transmitting electromagnetic waves from the antenna 320A using the electricity supplied from the power source.

In response to control by the controller 331, the communication interface 321 communicates wirelessly with an external device. In the present embodiment, the communication interface 321 communicates with the power receiver 100 and the power transceiver 200. The power transmitter 300 may communicate wirelessly using the antenna 320A instead of the communication interface 321. The communication interface 321 receives the power transmission request, the emergency power transmission request, and the like transmitted by the power receiver 100, for example.

The memory 330 can be configured by a semiconductor memory, a magnetic memory, or the like. The memory 330 stores various information and/or programs for operating the power transmitter 300. The memory 330 may also function as a working memory. The memory 330 may, for example, store identification information of the power receiver 100 and the power transceiver 200 on which authentication has been performed.

The controller 331 is a processor that controls and manages the power transmitter 300 overall, starting with the functional blocks of the power transmitter 300. The controller 331 is a processor, such as a CPU, that executes programs with prescribed control procedures or is a dedicated processor specialized for the processing of each function.

The electricity storage unit 340 can store electricity supplied from the power supply.

The power transceiver 200 has a power reception function and a power transmission function and functions as either a power receiver or a power transmitter in accordance with control conditions in the power transmission system 1.

The power transceiver 200 can receive wireless power from the power transmitter 300 when functioning as a power receiver. Like the above-described reception of wireless power by the power receiver 100, the power transceiver 200 can receive electromagnetic waves for power supply from the power transmitter 300 and convert the received electromagnetic waves to DC power in order to receive wireless power.

The power transceiver 200 supplies the received power to the electronic device housing the power transceiver 200 (here, the clock 20). Like the power receiver 100, the power transceiver 200 includes a positive electrode terminal and a negative electrode terminal and supplies power to the electronic device through the positive electrode terminal and the negative electrode terminal.

The power transceiver 200 can transmit wireless power to the power receiver 100 when functioning as a power transmitter. To transmit wireless power, the power transceiver 200 generates electromagnetic waves for power supply and transmits the generated electromagnetic waves to the power receiver 100. In the example in FIG. 1, the power transceiver 200 can transmit electromagnetic waves to the power receiver 100 in the mobile phone 10. The power transceiver 200 may transmit electromagnetic waves to the power receiver 100 on which authentication has been performed, i.e. the power receiver 100 corresponding to the identification information stored in a memory 230.

The power transceiver 200 includes a power transmission interface 210, a power reception interface 220, a communication interface 221, the memory 230, a controller 231, and an electricity storage unit 240.

The power reception interface 220 includes an antenna 220A and a rectifier circuit 220B. The antenna 220A receives electromagnetic waves from the power transmitter 300. The rectifier circuit 220B converts the electromagnetic waves received by the antenna 220A into DC power. The rectifier circuit 220B supplies the converted DC power to the electronic device through the positive electrode terminal and the negative electrode terminal.

The power transmission interface 210 includes an antenna 210A and an oscillator 210B. The oscillator 210B transmits wireless power by transmitting electromagnetic waves from the antenna 210A using the electricity supplied from the electricity storage unit 240.

In response to control by the controller 231, the communication interface 221 communicates wirelessly with an external device. In the present embodiment, the communication interface 221 communicates with the power receiver 100 and the power transmitter 300. The power transceiver 200 may communicate wirelessly using the antenna 220A or the antenna 210A instead of the communication interface 221. The communication interface 221 can, for example, transmit a power transmission request during normal circumstances. The communication interface 221 can, for example, receive the emergency power transmission request or the like transmitted by the power receiver 100 during an emergency.

The memory 230 can be configured by a semiconductor memory, a magnetic memory, or the like. The memory 230 stores various information and/or programs for operating the power transceiver 200. The memory 230 may also function as a working memory. The memory 230 may, for example, store identification information of the power receiver 100 on which authentication has been performed.

The controller 231 is a processor that controls and manages the power transceiver 200 overall, starting with the functional blocks of the power transceiver 200. The controller 231 is a processor, such as a CPU, that executes programs with prescribed control procedures or is a dedicated processor specialized for the processing of each function.

The electricity storage unit 240 is electrically connected to the positive electrode terminal and the negative electrode terminal of the power transceiver 200 and is electrically connected to the power reception interface 220 and the power transmission interface 210. The electricity storage unit 240 can store electricity, from among the power received by the power reception interface 220, that is not supplied to the electronic device (surplus electricity). The electricity stored by the electricity storage unit 240 may, for example, be supplied to the electronic device through the positive electrode terminal and the negative electrode terminal when the power transceiver 200 cannot receive wireless power from the power transmitter 300. The electricity stored in the electricity storage unit 240 may be used to transmit power from the power transmission interface 210 to the power receiver 100 in response to an emergency power transmission request from the power receiver 100.

Next, power transmission processing in the power transmission system 1 according to an embodiment is described. The power transmission system 1 according to an embodiment executes different processing during normal circumstances and during an emergency. In the present disclosure, the emergency in the power transmission system 1 refers to the case of electricity not being supplied from the power source to the power transmitter 300, for example. During such an emergency, transmission of wireless power from the power transmitter 300 to the power receiver 100 and the power transceiver 200 is also suspended as a result of electricity not being supplied from the power source to the power transmitter 300.

The emergency may, for example, be the case of the power receiver 100 not being able to receive wireless power from the power transmitter 300. The emergency may, for example, be the case of the power receiver 100 acquiring information related to the occurrence of a disaster. The emergency may, for example, be the case of performance of a predetermined input operation by the user of the mobile phone 10 in which the power receiver 100 is housed. The emergency is not limited to these examples and may, for example, be any case in which it can be judged that electricity is not supplied from the power source to the power transmitter 300.

The emergency may correspond to when a combination of any conditions from among these examples is satisfied. Combining a plurality of conditions makes it easier to prevent an emergency from being mistakenly judged due to erroneous operation of the power receiver 100 or the power transmitter 300, for example.

The power receiver 100 may judge whether an emergency has occurred. The power receiver 100 may, for example, judge that an emergency has occurred when the power reception interface 120 cannot receive wireless power. The power receiver 100 may, for example, judge that an emergency has occurred when information related to the occurrence of a disaster is transmitted by an external communication apparatus and acquired via the communication interface 121. The information related to the occurrence of a disaster may, for example, be an earthquake early warning regarding the occurrence of an earthquake. When the user performs a predetermined input operation on the mobile phone 10 to set the mobile phone 10 to an emergency state, for example, the power receiver 100 may judge that an emergency has occurred by acquiring a signal related to the setting via the communication interface 121. These determination methods by the power receiver 100 are only examples, and the power receiver 100 may determine that an emergency has occurred by other means. When no emergency has occurred, the power receiver 100 may judge that circumstances are normal.

In an example, the emergency may include the case of the power receiver 100 needing a supply of power at a faster rate than the power supply rate from the power transmitter 300 during normal circumstances. For example, when the user judges that a faster supply of power to the power receiver 100 than during normal circumstances is necessary, the user performs a predetermined input operation on the mobile phone 10 in which the power receiver 100 is housed. In response to this input operation, the power receiver 100 may judge that a supply of power at a faster rate than the power supply rate from the power transmitter 300 during normal circumstances is necessary and recognize that an emergency has occurred.

Figure 3:
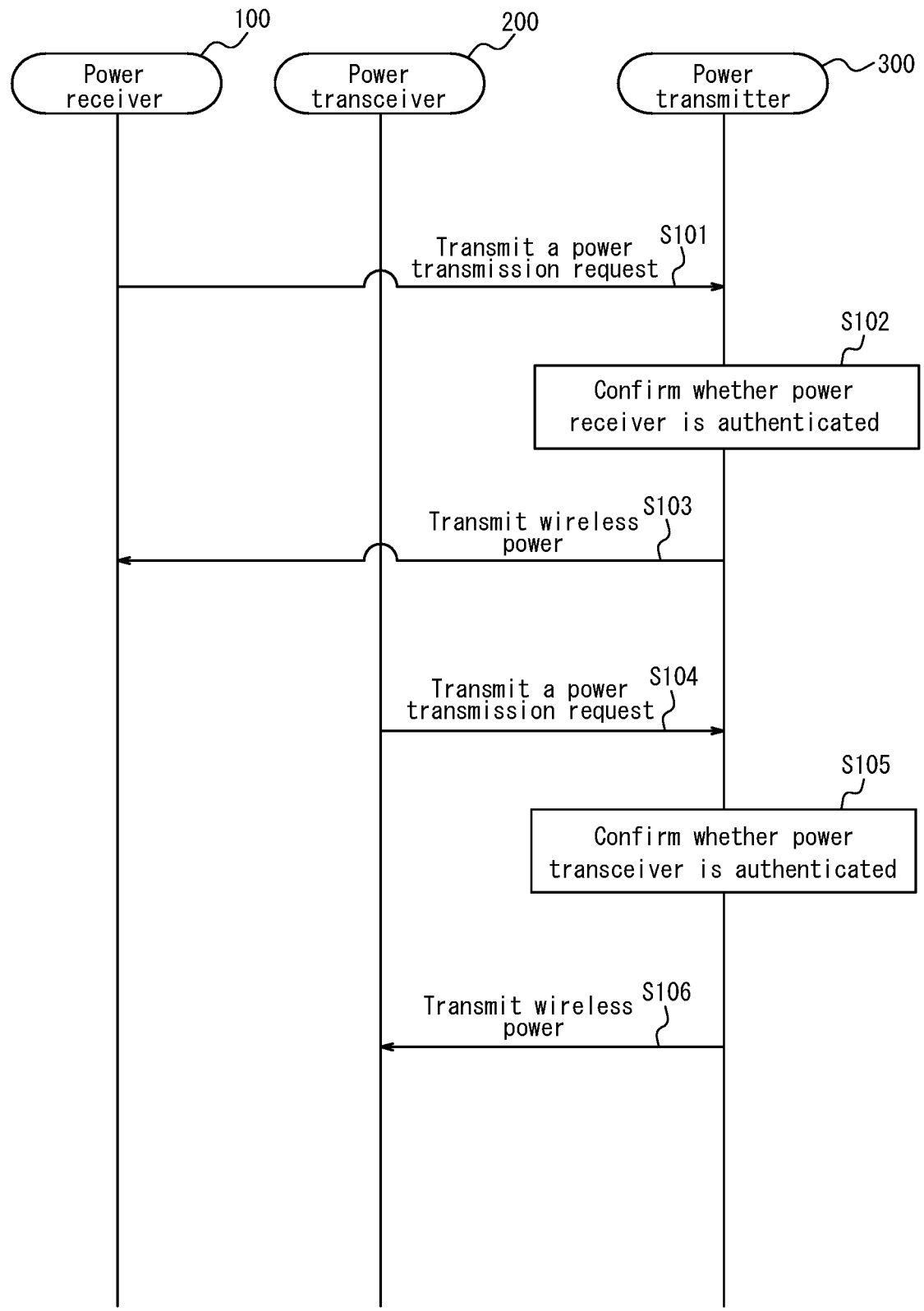
FIG. 3 is a sequence diagram illustrating an example of power transmission processing in the power transmission system of FIG. 2.

FIG. 3 is a sequence diagram illustrating an example of power transmission processing during normal circumstances. The power transceiver 200 functions as a power receiver during normal circumstances.

During normal circumstances, the power receiver 100 transmits a power transmission request (step S101). The power receiver 100 may, for example, transmit the power transmission request periodically or when judging that power reception is necessary. Power reception may be judged necessary when, for example, the amount of stored electricity in the electricity storage unit 140 of the power receiver 100 falls below a predetermined threshold. Identification information of the power receiver 100, for example, may be included in the power transmission request.

When the power transmitter 300 receives the power transmission request from the power receiver 100, the power transmitter 300 confirms (judges) whether the power receiver 100 that transmitted the power transmission request is a power receiver authenticated by the power transmitter 300 on the basis of the identification information of the power receiver 100 included in the power transmission request (step S102). For example, the power transmitter 300 judges whether the power receiver 100 is an authenticated power receiver on the basis of whether the identification information included in the power transmission request is included among the identification information stored in the memory 330.

When the power receiver 100 that transmitted the power transmission request is an authenticated power receiver, the power transmitter 300 transmits wireless power to the power receiver 100 (step S103). Wireless power is thus transmitted from the power transmitter 300 to the power receiver 100.

During normal circumstances, the power transceiver 200 transmits a power transmission request (step S104). The power transceiver 200 may, for example, transmit the power transmission request periodically or when judging that power reception is necessary, like the above-described power receiver 100. Identification information of the power transceiver 200, for example, may be included in the power transmission request.

When the power transmitter 300 receives the power transmission request from the power transceiver 200, the power transmitter 300 confirms (judges) whether the power transceiver 200 that transmitted the power transmission request is a power transceiver authenticated by the power transmitter 300 on the basis of the identification information of the power transceiver 200 included in the power transmission request (step S105).

When the power transceiver 200 that transmitted the power transmission request is an authenticated power transceiver, the power transmitter 300 transmits wireless power to the power transceiver 200 (step S106). Wireless power is thus transmitted from the power transmitter 300 to the power transceiver 200.

The procedures for power transmission processing illustrated in FIG. 3 are only an example and need not be executed in this order. During normal circumstances, it suffices for the power transceiver 200 to function as a power receiver and for wireless power to be transmitted from the power transmitter 300 to the power receiver 100 and the power transceiver 200.

Figure 4:
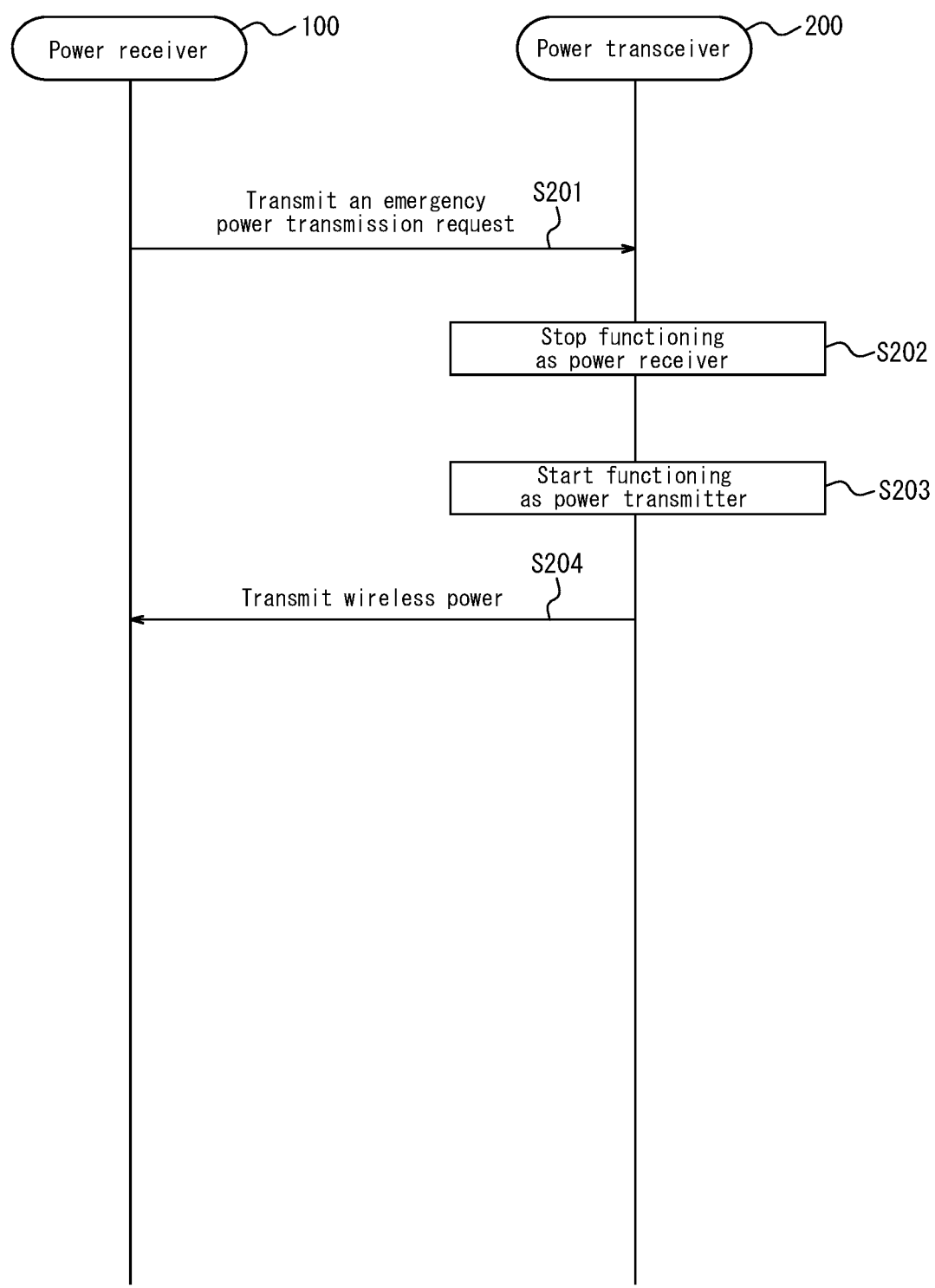
FIG. 4 is a sequence diagram illustrating an example of power transmission processing in the power transmission system of FIG. 2.

FIG. 4 is a sequence diagram illustrating an example of power transmission processing during an emergency. The power transceiver 200 functions as a power transmitter during an emergency.

When the power receiver 100 judges that an emergency has occurred, the power receiver 100 transmits an emergency power transmission request (step S201). The emergency power transmission request may, for example, include notification information indicating that an emergency has occurred. The power receiver 100 may, for example, transmit the emergency power transmission request at the time of judging that an emergency has occurred.

When receiving the emergency power transmission request from the power receiver 100, the power transceiver 200 can recognize that an emergency has occurred from the notification information included in the emergency power transmission request. In this case, the power transceiver 200 stops functioning as a power receiver (step S202). For example, the power transceiver 200 stops transmitting the power transmission request.

The power transceiver 200 then starts functioning as a power transmitter (step S203). In response to the emergency power transmission request of the power receiver 100, the power transceiver 200 transmits wireless power to the power receiver 100 (step S204). Wireless power is thus transmitted from the power transceiver 200 to the power receiver 100 during an emergency.

Before transmitting wireless power, the power transceiver 200 may acquire authentication information of the power receiver 100 and judge whether the power receiver 100 that transmitted the emergency power transmission request is a power receiver authenticated by the power transceiver 200.

Figure 5:
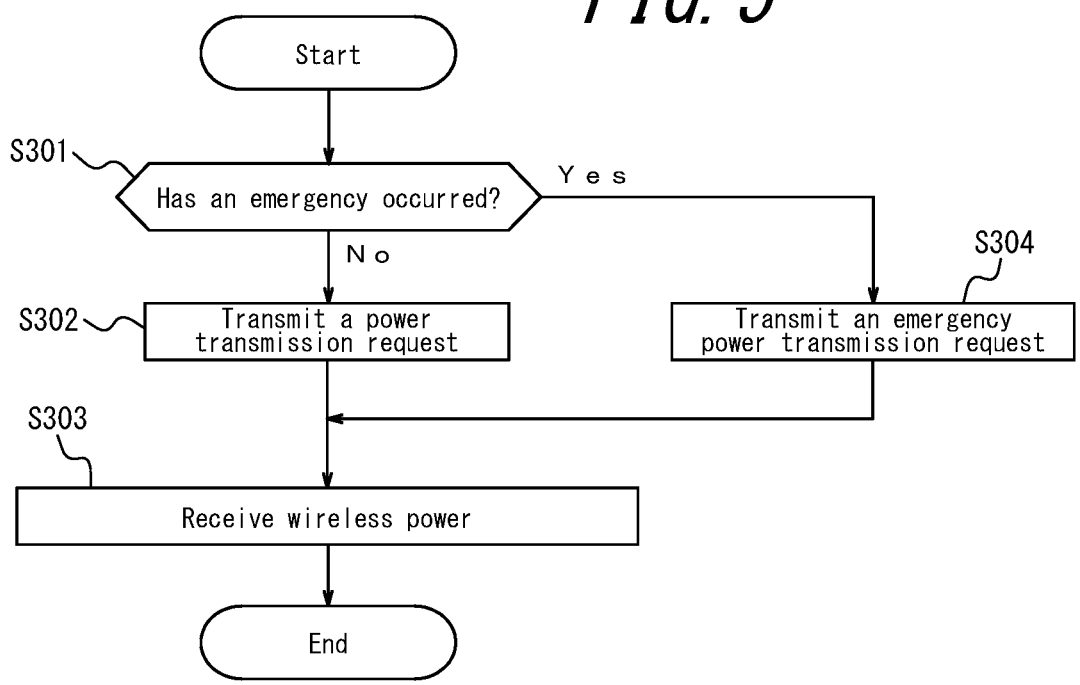
FIG. 5 is a flowchart illustrating an example of processing executed by the power receiver in FIG. 2.

Next, an example of the processing executed by the power receiver 100 is described with reference to the flowchart in FIG. 5. The power receiver 100 may, for example, execute the flowchart in FIG. 5 periodically or when judging that power reception is necessary.

The power receiver 100 judges whether an emergency has occurred (step S301). An emergency is judged by the above-described methods, for example.

When the power receiver 100 judges that an emergency has not occurred (step S301: No), the power receiver 100 transmits a power transmission request (step S302).

The power receiver 100 receives wireless power transmitted in response to the power transmission request (step S304). In other words, the power receiver 100 receives wireless power transmitted from the power transmitter 300. The power receiver 100 may store the received wireless power in the electricity storage unit 140.

When the power receiver 100 judges that an emergency has occurred (step S301: Yes), the power receiver 100 transmits an emergency power transmission request (step S303). The emergency power transmission request is a signal to request transmission of wireless power and includes a signal notifying that an emergency has occurred.

The power receiver 100 receives wireless power transmitted in response to the emergency power transmission request (step S304). In other words, the power receiver 100 receives wireless power transmitted from the power transceiver 200.

Figure 6:
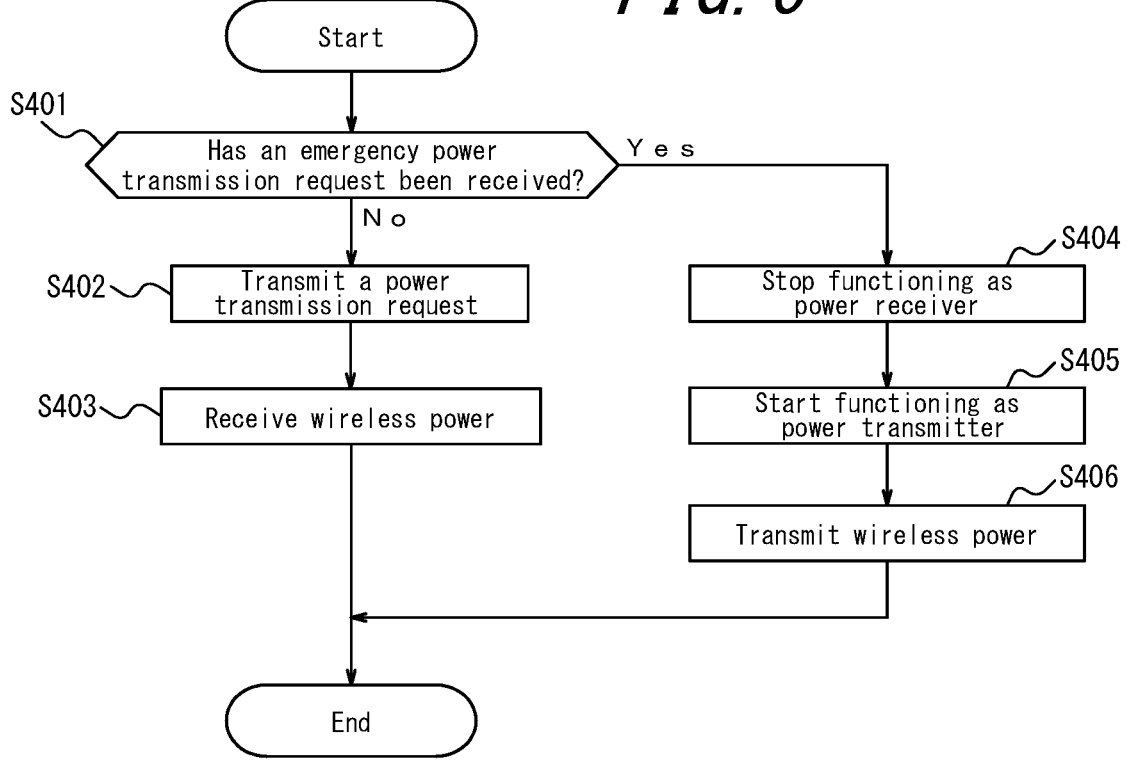
FIG. 6 is a flowchart illustrating an example of processing executed by the power transceiver in FIG. 2.

Next, an example of the processing executed by the power transceiver 200 is described with reference to the flowchart in FIG. 6. The power transceiver 200 may, for example, execute the flowchart in FIG. 6 periodically or when judging that power reception is necessary. At the start of the flowchart in FIG. 6, the power transceiver 200 is functioning as a power receiver.

The power transceiver 200 judges whether an emergency power transmission request has been received from the power receiver 100 (step S401).

When the power transceiver 200 judges that an emergency power transmission request has not been received from the power receiver 100 (step S401: No), the power transceiver 200 transmits a power transmission request (step S402).

The power transceiver 200 receives wireless power transmitted in response to the power transmission request (step S403). In other words, the power transceiver 200 receives wireless power transmitted from the power transmitter 300. The power transceiver 200 may transmit the received wireless power to the electricity storage unit 240.

When the power transceiver 200 judges that an emergency power transmission request has been received from the power receiver 100 (step S401: Yes), the power transceiver 200 recognizes that an emergency has occurred and stops functioning as a power receiver (step S404).

The power transceiver 200 then starts functioning as a power transmitter (step S405).

In response to the emergency power transmission request of the power receiver 100, the power transceiver 200 transmits wireless power to the power receiver 100 (step S406). The power transceiver 200 thus executes processing to transmit wireless power to the power receiver 100 during an emergency.

In this way, the power receiver 100 transmits an emergency power transmission request during an emergency in the power transmission system 1 according to the present embodiment. The power transceiver 200 functions as a power receiver that receives wireless power from the power transmitter 300 during normal circumstances. When receiving an emergency power transmission request from the power receiver 100, however, the power transceiver 200 judges that an emergency has occurred and functions as a power transmitter. In other words, when the power transmitter 300 can no longer supply wireless power during an emergency, the power transceiver 200 transmits wireless power to the power receiver 100. Consequently, wireless power is transmitted to the power receiver 100 even when wireless power is not supplied from the power transmitter 300, allowing the electronic device housing the power receiver 100 to continue operating even during an emergency. If the power receiver 100 is housed in the mobile phone 10 or a radio, for example, the mobile phone 10 or radio can also be used longer during an emergency, such as a disaster. The power transmission system 1 can thus be more useful.

When authentication is performed between the power receiver 100, the power transceiver 200, and the power transmitter 300, wireless power is not transmitted to a power receiver 100 or power transceiver 200 that has not performed authentication. This configuration can prevent wireless power from being transmitted from the power transmitter 300 or power transceiver 200 owned by a certain user to a power receiver 100 or power transceiver 200 owned by another user.

In the first embodiment, the controller 131 of the power receiver 100 may transmit information related to priority of power reception by the power receiver 100 from the communication interface 121 during an emergency. The power transceiver 200 uses the information related to priority of power reception to determine the order of priority of power transmission to a plurality of power receivers 100 during an emergency.

The information related to priority of power reception may, for example, be information related to the type of electronic device housing each power receiver 100. For example, when the power receiver 100 is housed in each of the mobile phone 10 and the radio, then each power receiver 100 transmits information related to the device housing the power receiver 100 (here, the mobile phone 10 and the radio) as the information related to priority of power reception. In this case, the information related to priority of power reception is input to the power receiver 100 in advance by the user, for example. When the power transceiver 200 receives the information related to priority of power reception from the communication interface 221, the power transceiver 200 transmits wireless power on a priority basis to either the mobile phone 10 or the radio in accordance with the order of priority set in advance by the user, for example.

The information related to priority of power reception may, for example, be information related to the owner of the electronic device. For example, when a power receiver 100 is housed in each of the mobile phones 10 owned by a mother, father, and child, then each power receiver 100 transmits information related to the owner of the mobile phone 10 (here, the father, mother, or child) as the information related to priority of power reception. In this case, the information related to priority of power reception is input to the power receiver 100 in advance by the user, for example. When the power transceiver 200 receives the information related to priority of power reception from the communication interface 221, the power transceiver 200 transmits wireless power on a priority basis to the power receiver 100 housed in the mobile phone 10 owned by one of the father, mother, and child in accordance with the order of priority set in advance by the user, for example.

The information related to priority of power reception may, for example, be information related to the amount of stored electricity. For example, the power receiver 100 housed in the electronic device transmits information related to the amount of stored electricity in the electricity storage unit 140 of the power receiver 100 as the information related to priority of power reception. When the power transceiver 200 receives the information related to priority of power reception from the communication interface 221, the power transceiver 200 transmits wireless power on a priority basis to the power receiver 100 that has the least amount of stored electricity, for example.

The power transceiver 200 may use a different factor as the information related to priority of power reception. For example, on the basis of the signal strength of signals transmitted by a plurality of power receivers 100, the power transceiver 200 may estimate the distance to each of the power receivers 100 as the information related to priority of power reception. On the basis of the estimated distance to each power receiver 100, the power transceiver 200 may, for example, judge that the power transmission efficiency of a nearby power receiver 100 is higher and transmit wireless power to the nearby power receiver 100 on a priority basis.

Transmitting wireless power on a priority basis may refer to transmitting wireless power to the power receiver 100 with the highest priority and not transmitting wireless power to other power receivers 100. Transmitting wireless power on a priority basis may refer to transmitting more power, stored as electricity in the electricity storage unit 240 of the power transceiver 200, as the priority of the power receiver 100 is higher. Transmitting wireless power on a priority basis may refer to transmitting wireless power in order, starting from the power receiver 100 with the highest priority, until the amount of stored electricity in each power receiver 100 reaches a predetermined value.

Figure 7:
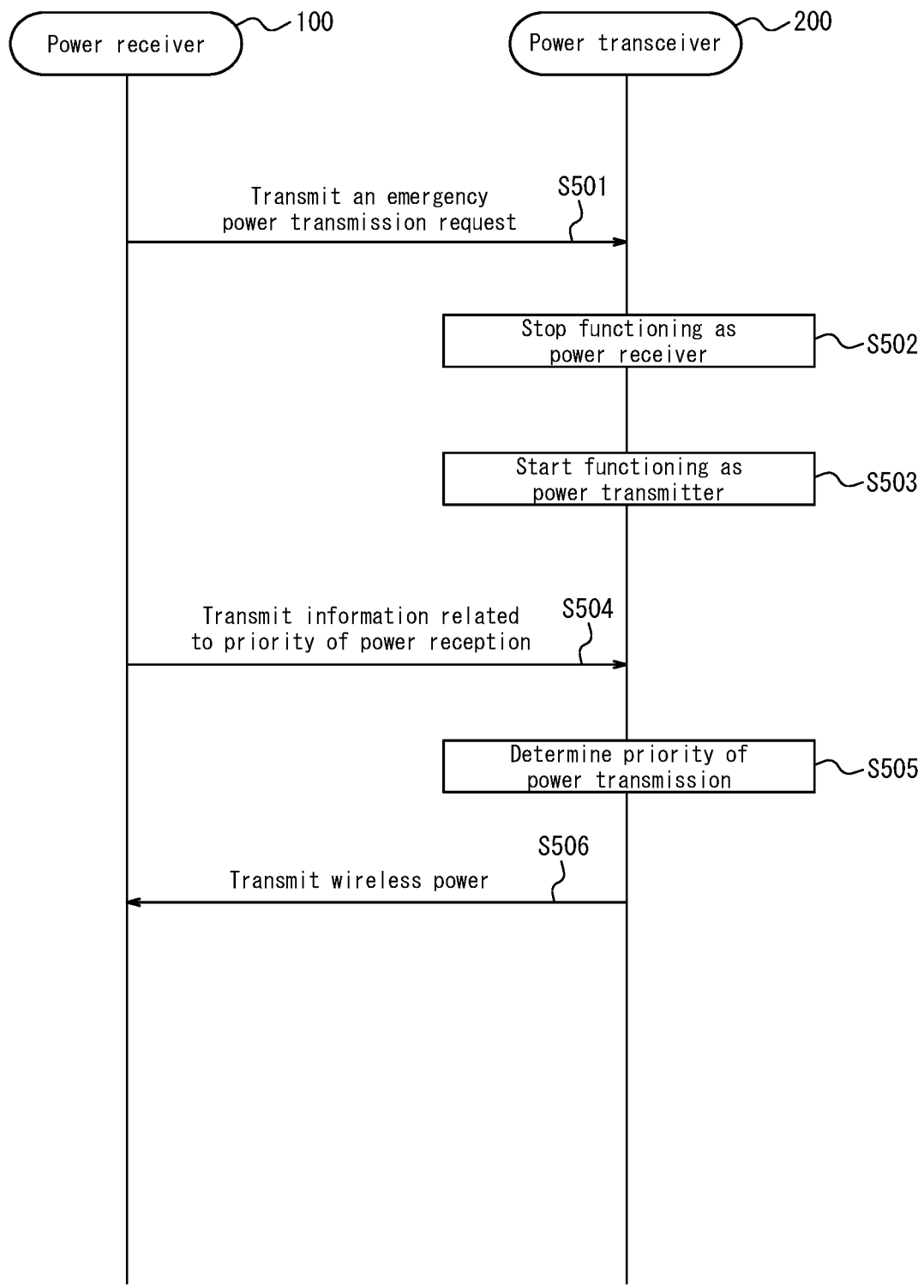
FIG. 7 is a sequence diagram illustrating a modification to power transmission processing in a power transmission system according to the first embodiment.

FIG. 7 is a sequence diagram illustrating an example of power transmission processing in the power transmission system 1 in the case of the power receiver 100 transmitting information related to priority of power reception. FIG. 7 illustrates an example of power transmission processing during an emergency in the power transmission system 1.

When the power receiver 100 judges that an emergency has occurred, the power receiver 100 transmits an emergency power transmission request (step S501). When receiving the emergency power transmission request from the power receiver 100, the power transceiver 200 stops functioning as a power receiver (step S502). The power transceiver 200 then starts functioning as a power transmitter (step S503). Step S501 through step S503 are respectively the same as step S201 through step S203 in FIG. 4. FIG. 7 only includes one power receiver 100 for the sake of illustration, but emergency power transmission requests are received from a plurality of power receivers 100.

The power receivers 100 each transmit information related to priority of power reception (step S504).

The power transceiver 200 determines the priority of power transmission to each power receiver 100 on the basis of the information related to priority of power reception acquired from the plurality of power receivers 100 (step S505).

The power transceiver 200 transmits wireless power to a power receiver 100 in accordance with the priority of power transmission determined in step S505 (step S506).

The sequence in FIG. 7 is merely an example of processing procedures, and processing need not be executed by the procedures illustrated in FIG. 7. For example, the power receiver 100 may transmit the information related to priority of power reception along with the emergency power transmission request in step S501.

In this way, when the power receiver 100 transmits the information related to priority of power reception, the power transceiver 200 can transmit wireless power to the power receiver 100 in accordance with the priority of power reception. Power can therefore be supplied on a priority basis to a power receiver 100 with high priority even when the supply of power is limited during an emergency, such as a disaster.

The power transceiver 200 in the first embodiment does not necessarily function as a power transmitter during an emergency. For example, each power transceiver 200 may be capable of switching between a first setting for functioning as a power receiver during normal circumstances and as a power transmitter during an emergency and a second setting for functioning as a power receiver during both normal circumstances and an emergency. In this case, a power transceiver 200 set to the second setting functions similarly to the power receiver 100. The power transmission system 1 therefore need not include the power receiver 100.

The first setting and the second setting of the power transceiver 200 are now described in detail. When set to the first setting, the power transmission interface 210 of the power transceiver 200 functions as a power transmitter during an emergency and transmits wireless power to the power receiver 100. When set to the second setting, the power transmission interface 210 of the power transceiver 200 functions as a power receiver even during an emergency and does not transmit wireless power to the power receiver 100. When set to the second setting, the power transceiver 200 transmits a power transmission request.

Figure 8:
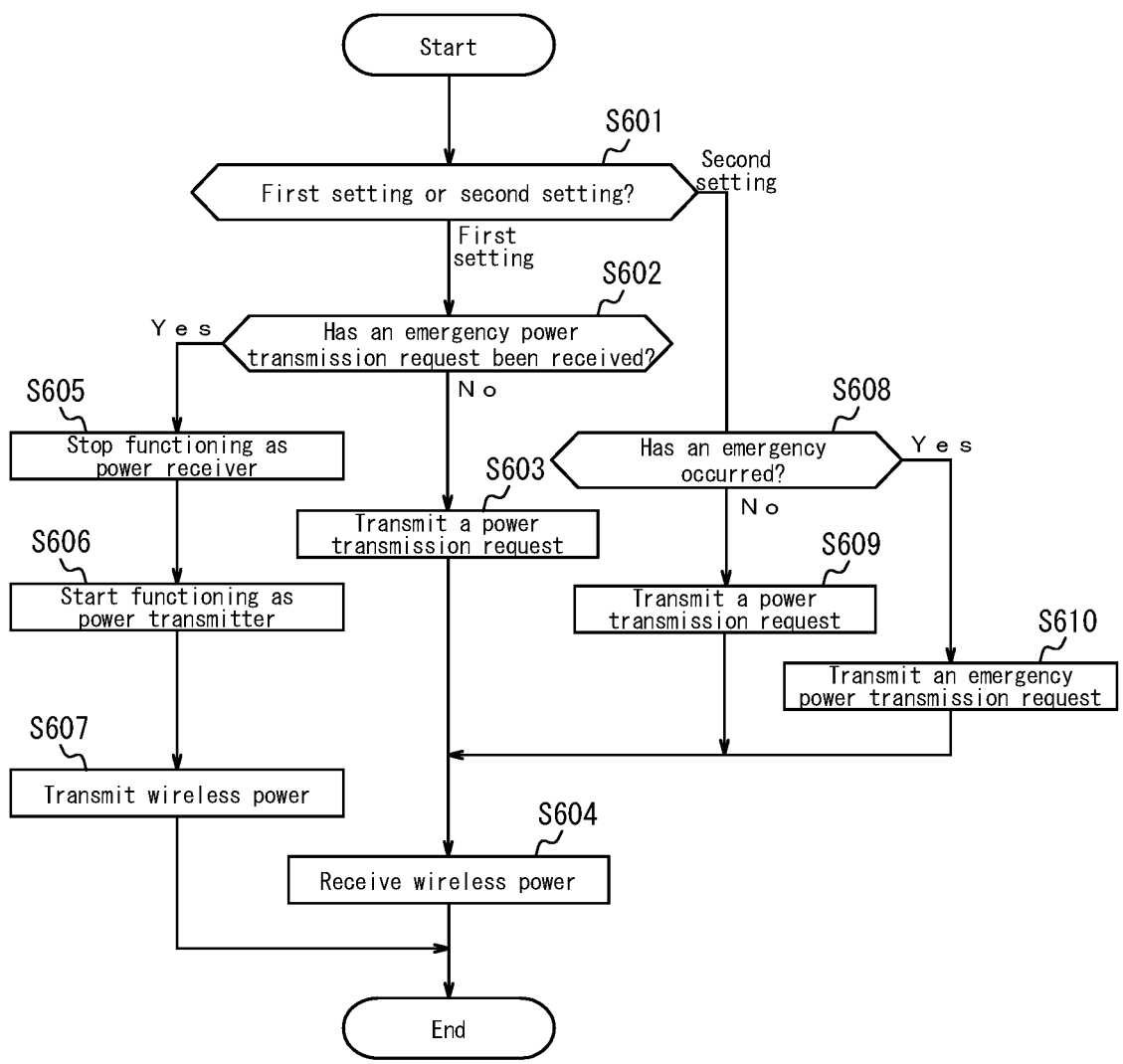
FIG. 8 is a flowchart illustrating a modification to processing executed by the power transceiver according to the first embodiment.

FIG. 8 is a flowchart illustrating an example of processing executed by the power transceiver 200 capable of switching between the first setting and the second setting. At the start of the flowchart in FIG. 8, the power transceiver 200 is functioning as a power receiver.

The controller 231 of the power transceiver 200 judges whether the power transceiver 200 is set to the first setting or to the second setting (step S601).

When the power transceiver 200 is set to the first setting (first setting in step S601), the power transceiver 200 functions as a power receiver during normal circumstances and functions as a power transmitter during an emergency. In other words, the power transceiver 200 judges whether an emergency power transmission request has been received from the power receiver 100 or a power transceiver 200 set to the second setting (step S602).

When the power transceiver 200 judges that an emergency power transmission request has not been received (step S602: No), the power transceiver 200 functions as a power receiver. In this case, the power transceiver 200 transmits a power transmission request (step S603).

The power transceiver 200 receives wireless power transmitted in response to the power transmission request (step S604).

When the power transceiver 200 judges that an emergency power transmission request has been received (step S602: Yes), the power transceiver 200 recognizes that an emergency has occurred and functions as a power transmitter. In this case, the power transceiver 200 stops functioning as a power receiver (step S605).

The power transceiver 200 then starts functioning as a power transmitter (step S606).

The power transceiver 200 transmits wireless power in response to the emergency power transmission request (step S607). The power transceiver 200 set to the first setting thus transmits wireless power during an emergency.

When the power transceiver 200 is set to the second setting (second setting in step S601), the power transceiver 200 functions as a power receiver during both normal circumstances and an emergency. In this case, the power transceiver 200 itself judges whether an emergency has occurred (step S608).

When the power transceiver 200 judges that an emergency has not occurred (step S608: No), the power transceiver 200 transmits a power transmission request (step S609). The power transceiver 200 receives wireless power transmitted in response to the power transmission request (step S604).

When the power transceiver 200 judges that an emergency has occurred (step S608: Yes), the power transceiver 200 transmits an emergency power transmission request (step S610). The power transceiver 200 receives wireless power transmitted in response to the emergency power transmission request (step S604).

When the power transceiver 200 is thus configured to be capable of switching between two settings, the processing for power reception or power transmission during an emergency can be set individually for electronic devices housing the power transceiver 200. In this case, the power transceiver 200 set to the second setting performs similar processing to the power receiver 100 described above in the first embodiment. The power transmission system 1 can therefore be configured to include a plurality of power transceivers 200 capable of being set to the first setting or the second setting and a power transmitter 300, without including the power receiver 100.

The switching between the first setting and the second setting in the power transceiver 200 can be implemented by various methods. For example, when the power transceiver 200 includes a switch capable of switching between the first setting and the second setting, the user can select the first setting or the second setting by operating the switch of the power transceiver 200.

For example, when the power transceiver 200 is capable of communicating with the mobile phone 10 used by the user, the user can set the power transceiver 200 to the first setting or the second setting by operating a screen of the mobile phone 10. Specifically, the user installs an application capable of switching the setting of the power transceiver 200 on the mobile phone 10 in advance, for example. When the user launches the application, a list of power transceivers 200 registered in advance by the user is displayed on the screen of the mobile phone 10, for example. The user can operate the mobile phone 10 to finalize or switch the settings of the power transceivers 200 displayed on the screen. The information that is set is transmitted to each power transceiver 200 in accordance with user operation of the mobile phone 10. The power transceiver 200 can execute processing to adopt the first setting or the second setting on the basis of the information set by the user. If the user can use the mobile phone 10 or the like in this way to change the setting of the power transceiver 200, the user can perform an operation to switch the setting when a disaster actually occurs, for example. Consequently, the setting of the power transceiver 200 housed in each electronic device can be changed appropriately when use of a predetermined electronic device becomes necessary or unnecessary, for example, in accordance with factors such as disaster conditions and the scale of the disaster.

When the power transceiver 200 is capable of communicating with the mobile phone 10 of the user, the power transceiver 200 may transmit the amount of electricity stored in the electricity storage unit 240 to the mobile phone 10 during an emergency. The mobile phone 10 can notify the user by displaying the amount of stored electricity of each power transceiver 200 on the screen.

The power transceiver 200 in the present embodiment may transmit the amount of electricity stored in the electricity storage unit 240 to the power receiver 100. The power receiver 100 may notify the user of the information related to the amount of stored electricity received from the power transceiver 200 by, for example, a visual method using an image, characters, light emission, or the like; an auditory method using audio or the like; or a combination of these methods. This allows the user to learn the amount of stored electricity of the power transceiver 200.

The power receiver 100 has been described as judging whether an emergency has occurred in the present embodiment, but the judgment of whether an emergency has occurred may be made by the power transceiver 200 or the power transmitter 300. For example, the power transmitter 300 may judge that an emergency has occurred when power is no longer supplied from the power source and may transmit notification information from the communication interface 321 to the power receiver 100 and the power transceiver 200 to provide notification of the emergency.

Second Embodiment

Figure 9:
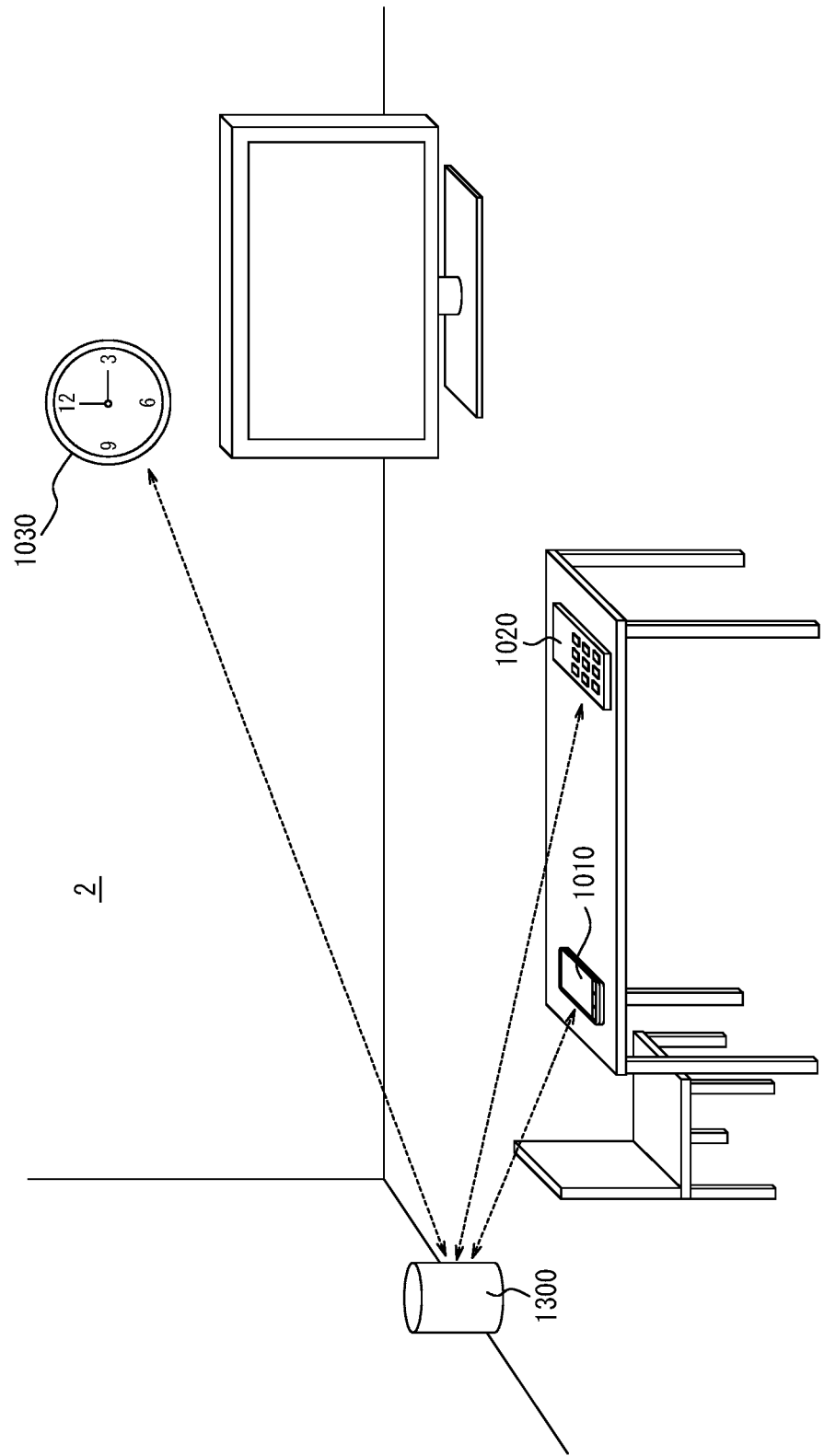
FIG. 9 illustrates the schematic configuration of a power transmission system according to a second embodiment.

FIG. 9 illustrates the schematic configuration of a power transmission system 2 according to a second embodiment. The power transmission system 2 includes a plurality of electronic devices and a power transmitter 1300. FIG. 9 depicts a mobile phone 1010, a remote controller (remote control) 1020, and a clock (wall-hanging clock) 1030 as examples of the plurality of electronic devices.

The plurality of electronic devices each house a power receiver or a power transceiver therein. In the present embodiment, the mobile phone 1010 houses a power receiver. In the present embodiment, the remote control 1020 and the clock 1030 house a power transceiver. Each electronic device may, for example, include a battery holder housing a power receiver or a power transceiver shaped to be housable in the battery holder. In this case, the power receiver or power transceiver may be shaped to appear like a dry cell battery, a button cell battery, or the like.

Each electronic device is driven by the power supplied from the power receiver or power transceiver housed therein. FIG. 9 illustrates the mobile phone 1010, the remote control 1020, and the clock 1030 as examples of electronic devices. The electronic devices are not, however, limited to the examples in FIG. 9 and may be any electronic device capable of being driven by a power receiver or a power transceiver. Examples of such electronic devices include a radio, a mouse, and an electronic dictionary.

Figure 10:
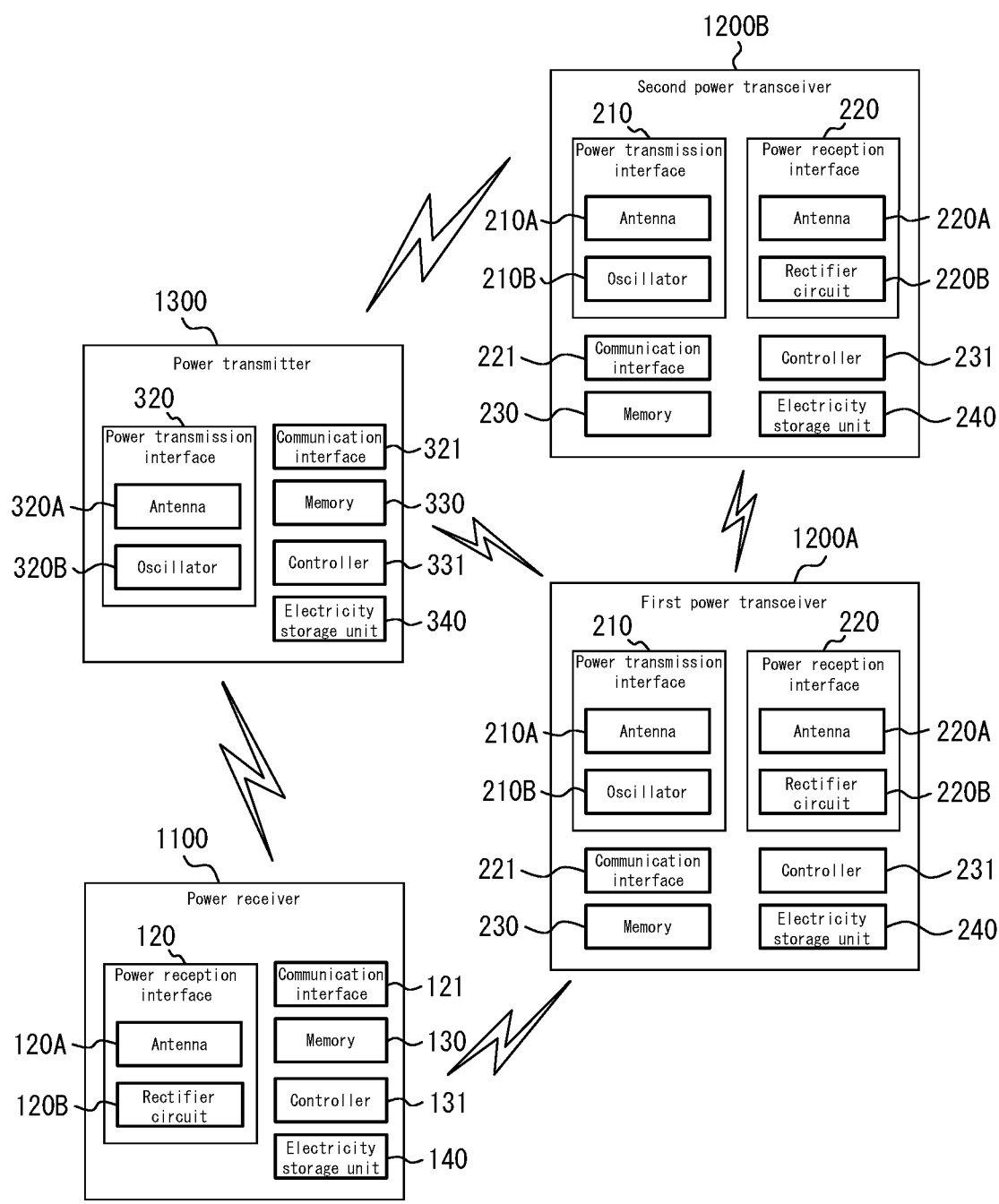
FIG. 10 is a functional block diagram illustrating the schematic configuration of the power transmission system in FIG. 9.

FIG. 10 is a functional block diagram illustrating the schematic configuration of the power transmission system 2. The power transmission system 2 includes a power receiver 1100, a first power transceiver 1200A, a second power transceiver 1200B, and a power transmitter 1300. Like the power transceiver 200 of the first embodiment, the first power transceiver 1200A and the second power transceiver 1200B have both the power reception function of a power receiver and the power transmission function of a power transmitter. In other words, the first power transceiver 1200A and the second power transceiver 1200B function as a power receiver and/or a power transmitter in accordance with predetermined conditions. The first power transceiver 1200A and the second power transceiver 1200B are collectively referred to as a power transceiver 1200 below when no distinction therebetween is made. For the sake of explanation, only one each of the power receiver 1100 and the power transmitter 1300 are illustrated, but the power transmission system 2 may include a plurality of each of the power receiver 1100 and the power transmitter 1300. The power transmission system 2 may include three or more power transceivers 1200.

The power receiver 1100, the power transceiver 1200, and the power transmitter 1300 include functional units similar to those of the power receiver 100, the power transceiver 200, and the power transmitter 300 of the first embodiment, respectively. A detailed description of the functional units of the power receiver 1100, the power transceiver 1200, and the power transmitter 1300 is therefore omitted.

In the present embodiment illustrated in the example in FIG. 9, the power transmitter 1300 transmits electromagnetic waves to the power receiver 1100 inside the mobile phone 1010 and to the power transceiver 1200 inside each of the remote control 1020 and the clock 1030.

Like the power transceiver 200 of the first embodiment, the power transceiver 1200 has a power reception function and a power transmission function. When functioning as a power receiver, the power transceiver 1200 in the present embodiment can receive wireless power from the power transmitter 1300 or from another power transceiver 1200. Like the above-described reception of wireless power by the power receiver 1100, the power transceiver 1200 can receive electromagnetic waves for power supply from the power transmitter 1300 or another power transceiver 1200 and convert the received electromagnetic waves to DC power in order to receive wireless power.

The power transceiver 1200 supplies the received power to the electronic device housing the power transceiver 1200 (here, the remote control 1020 or the clock 1030). Like the power receiver 1100, the power transceiver 1200 includes a positive electrode terminal and a negative electrode terminal and supplies power to the electronic device through the positive electrode terminal and the negative electrode terminal.

The power transceiver 1200 can transmit wireless power to the power receiver 1100 or another power transceiver 1200 when functioning as a power transmitter. To transmit wireless power, the power transceiver 1200 generates electromagnetic waves for power supply and transmits the generated electromagnetic waves to the power receiver 1100 or another power transceiver 1200. The power transceiver 1200 may, for example, perform authentication on the power receiver 1100 or another power transceiver 1200 and transmit electromagnetic waves to the power receiver 1100 or other power transceiver 1200 on which authentication has been performed.

During an emergency, the power transceiver 1200 of the present embodiment may function as a power receiver to receive wireless power from another power transceiver 1200 and function as a power transmitter to transmit wireless power to the power receiver 1100. For example, when a plurality of power transceivers 1200 are to transmit power to the power receiver 1100 during an emergency, transmission of wireless power from a power transceiver 1200 to the power receiver 1100 might not be possible depending on the distance between the power receiver and the power transceiver 1200. When the power receiver 1100 is thus located outside of the power transmission range of a certain power transceiver 1200, the certain power transceiver 1200 may transmit wireless power to another power transceiver 1200 that is located within the power transmission range of the certain power transceiver 1200 and that has the power receiver 1100 located within its own power transmission range. The other power transceiver 1200 that receives wireless power from the certain power transceiver 1200 can transmit the received wireless power to the power receiver 1100. In this way, even when the power receiver 1100 is located outside of the power transmission range, the power transceiver 1200 can transmit wireless power to the power receiver 1100 via another power transceiver 1200.

Each power transceiver 1200 can, for example, judge whether the power receiver 1100 is located within the power transmission range on the basis of the signal strength of an emergency power transmission request or the like received from the power receiver 1100. Power transceivers 1200 can also judge each other regarding location within the power transmission range on the basis of the signal strength at the time of receipt of a power transmission request (a relay power transmission request, described below) or the like transmitted and received between power transceivers 1200. The transmission range of an emergency power transmission request or a relay power transmission request may, for example, be greater than the power transmission range. A detailed example of processing procedures by the power transceiver 1200 is described below.

In the present embodiment, the communication interface 221 of the power transceiver 1200 communicates with the power receiver 1100, the power transmitter 1300, and another power transceiver 1200. The communication interface 221 in the present embodiment may, in response to an emergency power transmission request received from the power receiver 1100, transmit a relay power transmission request to another power transceiver 1200 to request transmission of power to the power receiver 1100.

In the present embodiment, the memory 230 of the power transceiver 1200 may, for example, store identification information of the power receiver 1100 or another power transceiver 1200 on which authentication has been performed.

In the present embodiment, the electricity storage unit 240 of the power transceiver 1200 can store surplus electricity. The electricity stored by the electricity storage unit 240 may, for example, be supplied to the electronic device through the positive electrode terminal and the negative electrode terminal when the power transceiver 1200 cannot receive wireless power from the power transmitter 1300 In response to an emergency power transmission request, power may be transmitted from the power transmission interface 210 to the power receiver 1100 or to another power transceiver 1200 using the electricity stored in the electricity storage unit 240.

Next, power transmission processing in the power transmission system 2 according to the present embodiment is described. The power transmission system 2 according to the present embodiment executes different processing during normal circumstances and during an emergency.

Figure 11:
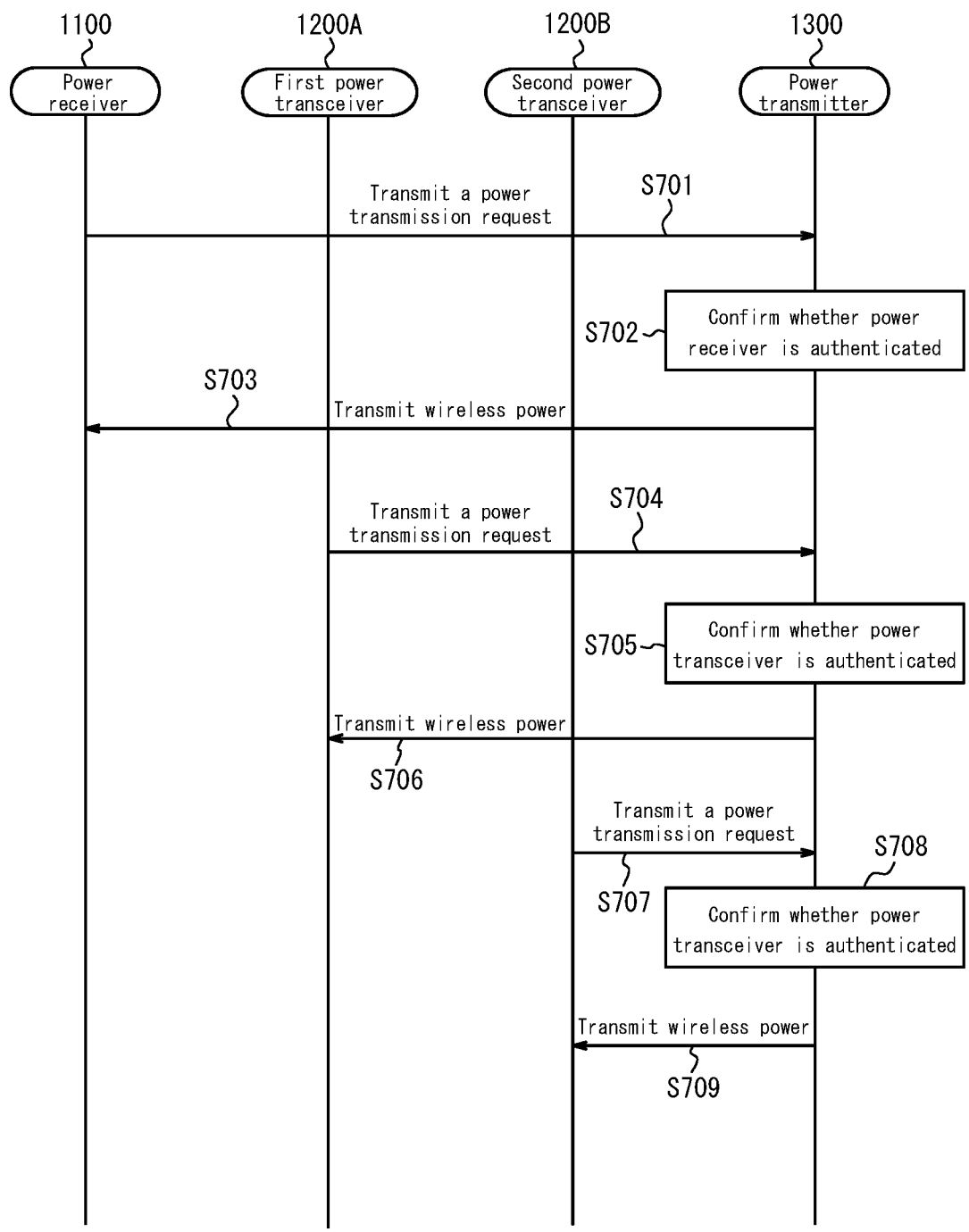
FIG. 11 is a sequence diagram illustrating an example of power transmission processing in the power transmission system of FIG. 10.

FIG. 11 is a sequence diagram illustrating an example of power transmission processing during normal circumstances. The power transceiver 1200 functions as a power receiver during normal circumstances.

During normal circumstances, the power receiver 1100 transmits a power transmission request (step S701). The power receiver 1100 may, for example, transmit the power transmission request periodically or when judging that power reception is necessary. Power reception may be judged necessary when, for example, the amount of stored electricity in the electricity storage unit 140 of the power receiver 1100 falls below a predetermined threshold. Identification information of the power receiver 1100, for example, may be included in the power transmission request.

When the power transmitter 1300 receives the power transmission request from the power receiver 1100, the power transmitter 1300 confirms (judges) whether the power receiver 1100 that transmitted the power transmission request is a power receiver authenticated by the power transmitter 1300 on the basis of the identification information of the power receiver 1100 included in the power transmission request (step S702). For example, the power transmitter 1300 judges whether the power receiver 1100 is an authenticated power receiver on the basis of whether the identification information included in the power transmission request is included among the identification information stored in the memory 330.

When the power receiver 1100 that transmitted the power transmission request is an authenticated power receiver, the power transmitter 1300 transmits wireless power to the power receiver 1100 (step S703). Wireless power is thus transmitted from the power transmitter 1300 to the power receiver 1100.

During normal circumstances, the power transceiver 1200 transmits a power transmission request. For example, the first power transceiver 1200A transmits a power transmission request (step S704). The power transceiver 1200 may, for example, transmit the power transmission request periodically or when judging that power reception is necessary, like the above-described power receiver 1100. Identification information of the power transceiver 1200, for example, may be included in the power transmission request.

When the power transmitter 1300 receives the power transmission request from the first power transceiver 1200A, the power transmitter 1300 confirms (judges) whether the first power transceiver 1200A that transmitted the power transmission request is a power transceiver authenticated by the power transmitter 1300 on the basis of the identification information of the first power transceiver 1200A included in the power transmission request (step S705).

When the first power transceiver 1200A that transmitted the power transmission request is an authenticated power transceiver, the power transmitter 1300 transmits wireless power to the first power transceiver 1200A (step S706). Wireless power is thus transmitted from the power transmitter 1300 to the first power transceiver 1200A.

Wireless power is also supplied to the second power transceiver 1200B in the same way as to the first power transceiver 1200A. That is, the second power transceiver 1200B transmits a power transmission request (step S707). When the power transmitter 1300 receives the power transmission request from the second power transceiver 1200B, the power transmitter 1300 confirms (judges) whether the second power transceiver 1200B that transmitted the power transmission request is a power transceiver authenticated by the power transmitter 1300 on the basis of the identification information of the second power transceiver 1200B included in the power transmission request (step S708). When the second power transceiver 1200B that transmitted the power transmission request is an authenticated power transceiver, the power transmitter 1300 transmits wireless power to the second power transceiver 1200B (step S709).

The procedures for power transmission processing illustrated in FIG. 11 are only an example and need not be executed in this order. During normal circumstances, it suffices for the power transceiver 1200 to function as a power receiver and for wireless power to be transmitted from the power transmitter 1300 to the power receiver 1100 and the power transceiver 1200.

Figure 12:
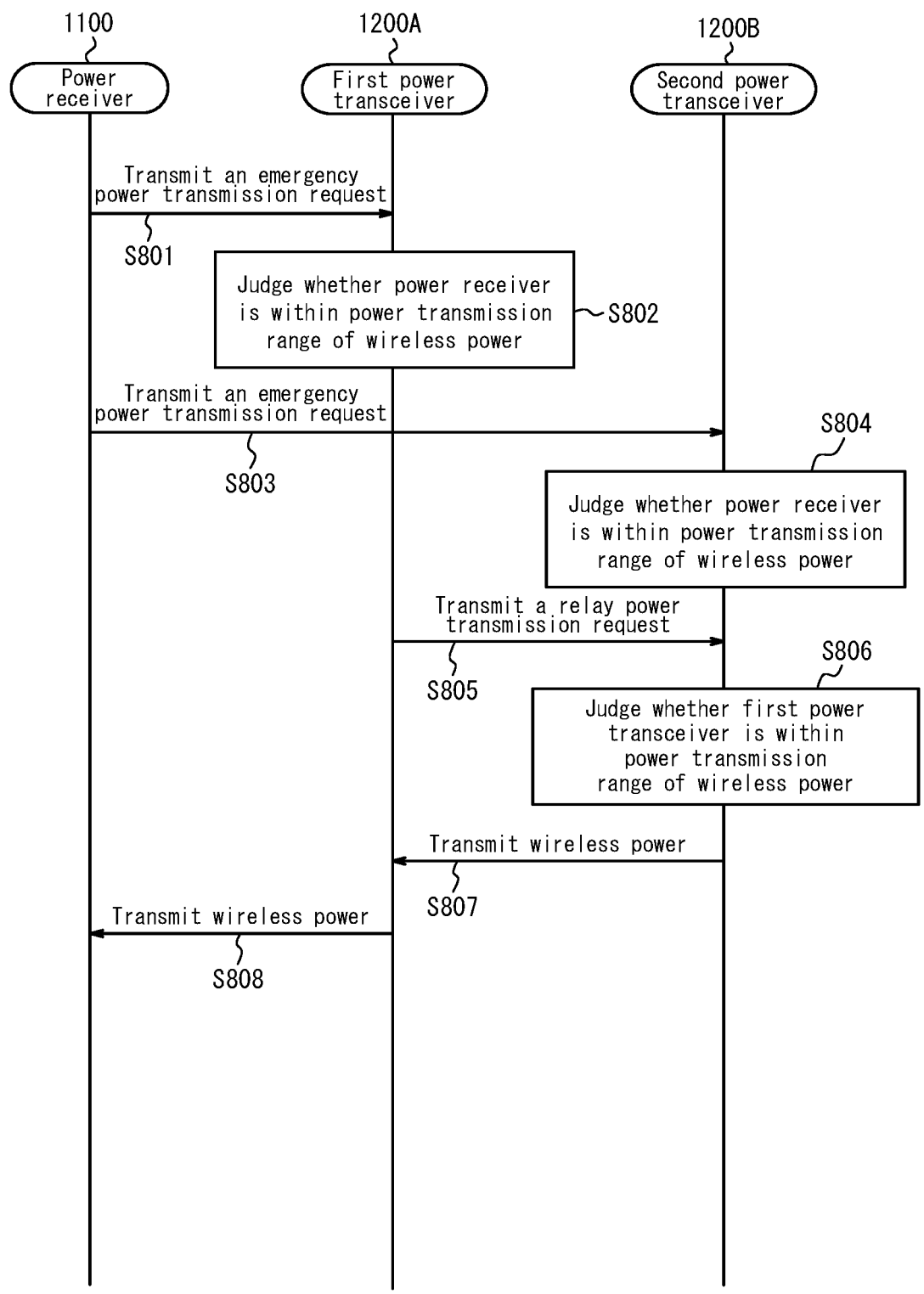
FIG. 12 is a sequence diagram illustrating an example of power transmission processing in the power transmission system of FIG. 10.

FIG. 12 is a sequence diagram illustrating an example of power transmission processing during an emergency. During an emergency, the power transceiver 1200 does not receive wireless power from the power transmitter 1300. In the example in FIG. 12, the power receiver 1100 is described as being located within the power transmission range of the first power transceiver 1200A and outside of the power transmission range of the second power transceiver 1200B.

When the power receiver 1100 judges that an emergency has occurred, the power receiver 1100 transmits an emergency power transmission request (step S801). The emergency power transmission request may, for example, include notification information indicating that an emergency has occurred. The power receiver 1100 may, for example, transmit the emergency power transmission request at the time of judging that an emergency has occurred.

The first power transceiver 1200A judges, based on the signal strength of the emergency power transmission request received from the power receiver 1100, whether the power receiver 1100 is within the power transmission range of wireless power from the first power transceiver 1200A (step S802). In the example in FIG. 12, the first power transceiver 1200A judges that the power receiver 1100 is within the power transmission range of wireless power from the first power transceiver 1200A. The first power transceiver 1200A can recognize that an emergency has occurred by receiving the emergency power transmission request.

The emergency power transmission request transmitted by the power receiver 1100 is also received by the second power transceiver 1200B (step S803).

The second power transceiver 1200B judges, based on the signal strength of the emergency power transmission request received from the power receiver 1100, whether the power receiver 1100 is within the power transmission range of wireless power from the second power transceiver 1200B (step S804). In the example in FIG. 12, the second power transceiver 1200B judges that the power receiver 1100 is outside of the power transmission range of wireless power from the second power transceiver 1200B. The second power transceiver 1200B can recognize that an emergency has occurred by receiving the emergency power transmission request.

The first power transceiver 1200A, which judged that the power receiver 1100 is within the power transmission range of wireless power, transmits a relay power transmission request on the basis of the emergency power transmission request (step S805).

When the second power transceiver 1200B, which judged that the power receiver 1100 is outside of the power transmission range of wireless power, receives the relay power transmission request from the first power transceiver 1200A, the second power transceiver 1200B judges whether the first power transceiver 1200A is within the power transmission range of wireless power from the second power transceiver 1200B on the basis of the signal strength of the received relay power transmission request (step S806). Here, the second power transceiver 1200B is assumed to judge that the first power transceiver 1200A is within the power transmission range of wireless power from the second power transceiver 1200B.

The second power transceiver 1200B, which judged that the first power transceiver 1200A is within the power transmission range of wireless power, transmits power to the first power transceiver 1200A using the electricity stored in the electricity storage unit 240 of the second power transceiver 1200B (step S807).

The first power transceiver 1200A transmits the wireless power received from the second power transceiver 1200B to the power receiver 1100 (step S808). The first power transceiver 1200A may also transmit power to the power receiver 1100 using the electricity stored in the electricity storage unit 240 of the first power transceiver 1200A. In this way, wireless power is transmitted to the power receiver 1100 from the power transceiver 1200 that has the power receiver 1100 within its power transmission range (first power transceiver 1200A), and wireless power is also supplied to the power receiver 1100 from the power transceiver 1200 that does not have the power receiver 1100 within its power transmission range (second power transceiver 1200B). More power is therefore supplied to the power receiver 1100 than when power is not supplied to the power receiver 1100 from the power transceiver 1200 that has the power receiver 1100 outside of its power transmission range.

In the present embodiment, the processing executed by the power receiver 1100 may, for example, be similar to the processing described with reference to FIG. 5 in the first embodiment. Hence, a detailed explanation is omitted here.

Figure 13:
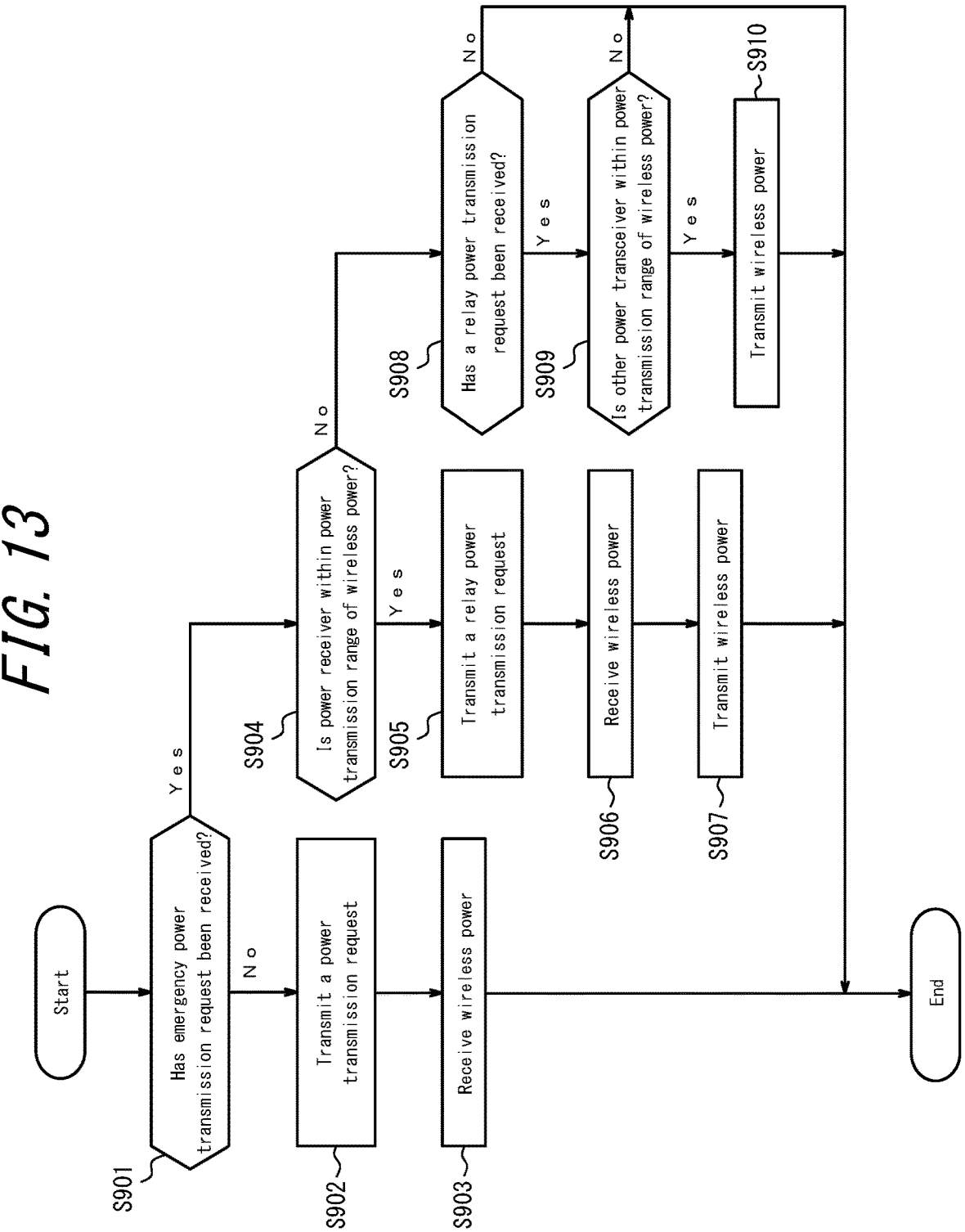
FIG. 13 is a flowchart illustrating an example of processing executed by the power transceiver in FIG. 10.

Next, an example of the processing executed by the power transceiver 1200 is described with reference to the flowchart in FIG. 13. The power transceiver 1200 may, for example, execute the flowchart in FIG. 13 periodically or when judging that power reception is necessary. At the start of the flowchart in FIG. 13, the power transceiver 1200 is functioning as a power receiver.

The power transceiver 1200 judges whether an emergency power transmission request has been received from the power receiver 1100 (step S901).

When the power transceiver 1200 judges that an emergency power transmission request has not been received from the power receiver 1100 (step S901: No), the power transceiver 1200 transmits a power transmission request (step S902).

The power transceiver 1200 receives wireless power transmitted in response to the power transmission request (step S903). In other words, the power transceiver 1200 receives wireless power transmitted from the power transmitter 1300. The power transceiver 1200 may transmit the received wireless power to the electricity storage unit 240.

When the power transceiver 1200 judges that an emergency power transmission request has been received from the power receiver 1100 (step S901: Yes), the power transceiver 1200 judges whether the power receiver 1100 is within the power transmission range of wireless power on the basis of the signal strength of the received emergency power transmission request (step S904).

When the power transceiver 1200 judges that the power receiver 1100 is within the power transmission range of wireless power (step S904: Yes), the power transceiver 1200 transmits a relay power transmission request (step S905).

The power transceiver 1200 receives wireless power transmitted in response to the relay power transmission request (step S906). In other words, the power transceiver 1200 receives wireless power transmitted from another power transceiver 1200.

The power transceiver 1200 transmits wireless power to the power receiver 1100 (step S907). At this time, the power transceiver 1200 transmits the wireless power received in step S906 to the power receiver 1100. The power transceiver 1200 may also transmit power at this time using the electricity stored in the electricity storage unit 240 of the power transceiver 1200.

When the power transceiver 1200 judges that the power receiver 1100 is not within the power transmission range of wireless power (step S904: No), the power transceiver 1200 judges whether a relay power transmission request has been received from another power transceiver 1200 (step S908).

When the power transceiver 1200 judges that a relay power transmission request has been received (step S908: Yes), the power transceiver 1200 judges whether the other power transceiver 1200 that transmitted the relay power transmission request is within the power transmission range of wireless power on the basis of the signal strength of the received relay power transmission request (step S909).

When the power transceiver 1200 judges that the other power transceiver 1200 is within the power transmission range of wireless power (step S909: Yes), the power transceiver 1200 transmits power to the other power transceiver 1200 using the electricity stored in the electricity storage unit 240 of the power transceiver 1200 (step S910).

When the power transceiver 1200 judges that the other power transceiver 1200 is not within the power transmission range of wireless power (step S909: No), the power transceiver 1200 terminates the processing flow without transmitting wireless power.

When the power transceiver 1200 judges that a relay power transmission request has not been received (step S908: No), the power transceiver 1200 terminates the processing flow without transmitting wireless power.

In this way, the power receiver 1100 transmits a different emergency power transmission request during an emergency than during normal circumstances in the power transmission system 2 according to the present embodiment. The power transceiver 1200 that has the power receiver 1100 within its power transmission range transmits a relay power transmission request on the basis of the emergency power transmission request of the power receiver 1100. On the basis of the relay power transmission request, the power transceiver 1200 transmits power to the power receiver 1100 using power received from another power transceiver 1200 that does not have the power receiver 1100 within its power transmission range. The electricity stored in another power transceiver that does not have the power receiver 1100 within its power transmission range can thus be supplied to the power receiver 1100 in the power transmission system 2. Therefore, when wireless power is not supplied from the power transmitter 1300, more power can be supplied to the power receiver 1100 in the power transmission system 2 than when the electricity stored in another power transceiver 1200 that does not have the power receiver 1100 within its power transmission range is not supplied to the power receiver 1100. Consequently, the power transmission system 2 is more useful. If the power receiver 1100 is housed in the mobile phone 1010 or a radio, for example, the mobile phone 1010 or radio can also be used longer during an emergency, such as a disaster.

In the present embodiment, an example of power being transmitted to the power receiver 1100 through the first power transceiver 1200A using the electricity stored in the second power transceiver 1200B has been described with reference to FIG. 12, but the processing for power transmission to the power receiver 1100 is not limited to this example. For example, power may be transmitted to the power receiver 1100 through two or more power transceivers 1200 using the electricity stored in a power transceiver 1200.

Each power transceiver 1200 in the present embodiment as well may transmit the amount of electricity stored in the electricity storage unit 240 to the power receiver 1100. The power receiver 1100 may notify the user of the information related to the amount of stored electricity received from the power transceiver 1200 by, for example, a visual method using an image, characters, light emission, or the like; an auditory method using audio or the like; or a combination of these methods. This allows the user to learn the amount of stored electricity of the power transceiver 1200.

The judgment of whether an emergency has occurred may be made by the power transceiver 1200 or the power transmitter 1300 in the present embodiment as well. For example, the power transmitter 1300 may judge that an emergency has occurred when power is no longer supplied from the power source and may transmit notification information from the communication interface 321 to the power receiver 1100 and the power transceiver 1200 to provide notification of the emergency.

In the example described in the present embodiment, each power transceiver 1200 can judge whether the power receiver 1100 is located within the power transmission range on the basis of the signal strength of an emergency power transmission request or the like received from the power receiver 1100. In this example, the power transceivers 1200 can also judge each other regarding location within the power transmission range on the basis of the signal strength at the time of receipt of a power transmission request or the like transmitted and received between power transceivers 1200. The means for judging whether the power receiver 1100 or the power transceiver 1200 is located within the power transmission range is not, however, limited to this example. For example, each power transceiver 1200 can judge whether the power receiver 1100 is located within the power transmission range on the basis of the efficiency of power transmission to the power receiver 1100 (or the efficiency of reception of power by the power receiver 1100 from each power transceiver 1200). For example, the power transceivers 1200 can also judge each other regarding location within the power transmission range on the basis of the power transmission efficiency between the power transceivers 1200 (or the power reception efficiency). In these cases, it can be judged that the power receiver 1100 or the power transceiver 1200 is not located within the power transmission range when the power transmission efficiency (or power reception efficiency) is less than a predetermined threshold, for example.

Third Embodiment

Figure 14:
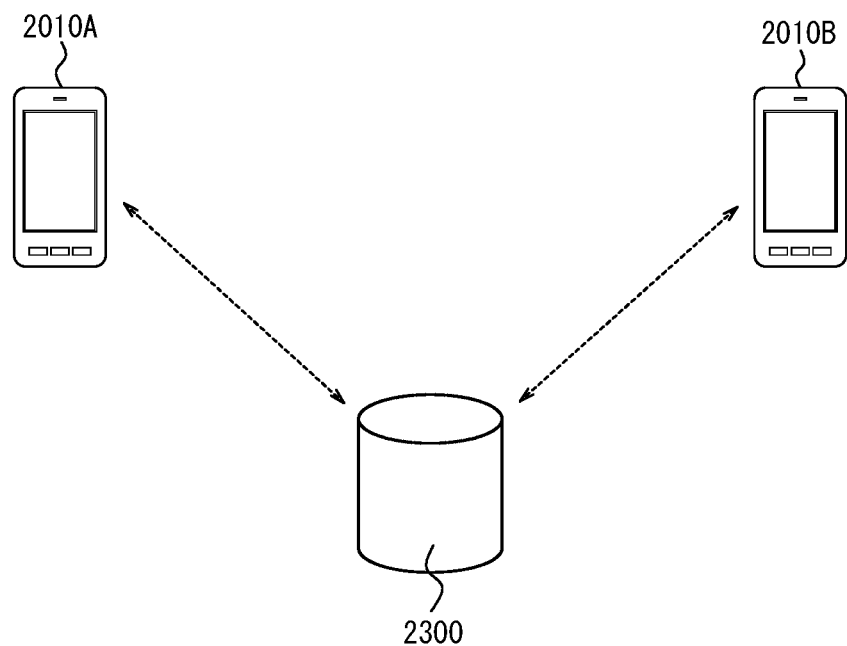
FIG. 14 illustrates the schematic configuration of a power transmission system according to a third embodiment.

FIG. 14 illustrates the schematic configuration of a power transmission system 3 according to a third embodiment. The power transmission system 3 includes a plurality of electronic devices and a power transmitter 2300. FIG. 14 depicts two mobile phones 2010A and 2010B as examples of the plurality of electronic devices. The number of electronic devices is not, however, limited to two. The power transmission system 3 may include any number of electronic devices. In the present embodiment, the mobile phones 2010A and 2010B are collectively referred to as a mobile phone 2010 below when no distinction therebetween is made.

The plurality of electronic devices each house a power receiver therein. Each electronic device may, for example, include a battery holder housing a power receiver shaped to be housable in the battery holder. In this case, the power receiver may be shaped to appear like a dry cell battery, a button cell battery, or the like.

Each electronic device is driven by the power supplied from the power receiver housed therein. FIG. 14 illustrates the mobile phone 2010 as an example of the electronic devices. The electronic devices are not, however, limited to the example in FIG. 14 and may be any electronic device capable of being driven by a power receiver. Examples of such electronic devices include a clock, a radio, a remote control, a mouse, and an electronic dictionary.

Figure 15:
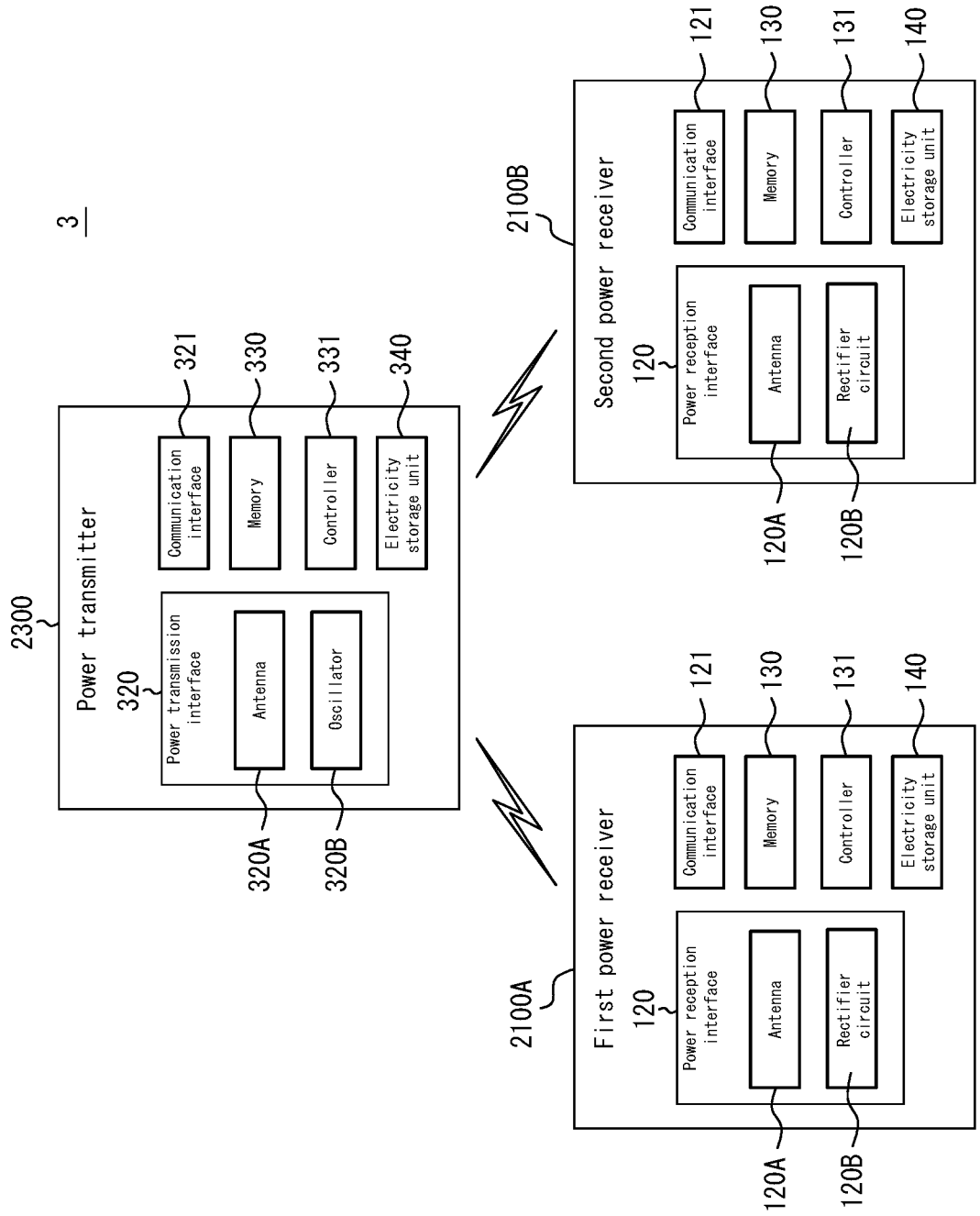
FIG. 15 is a functional block diagram illustrating the schematic configuration of the power transmission system in FIG. 14.

FIG. 15 is a functional block diagram illustrating the schematic configuration of the power transmission system 3. The power transmission system 3 includes a first power receiver 2100A, a second power receiver 2100B, and a power transmitter 2300. In the power transmission system 3, the power transmitter 2300 can transmit wireless power to the first power receiver 2100A and the second power receiver 2100B. The first power receiver 2100A is housed in the mobile phone 2010A, and the second power receiver 2100B is housed in the mobile phone 2010B. In the present embodiment, the first power receiver 2100A and the second power receiver 2100B are collectively referred to as a power receiver 2100 below when no distinction therebetween is made. For the sake of explanation, only two power receivers 2100 and one power transmitter are illustrated in FIG. 15, but the number of power receivers 2100 and power transmitters 2300 in the power transmission system 3 is not limited to this example.

The power receiver 2100 can receive wireless power from the power transmitter 2300. Specifically, the power receiver 2100 can receive electromagnetic waves for power supply from the power transmitter 2300. The power receiver 2100 converts the received electromagnetic waves into DC power. The power receiver 2100 can thus receive wireless power. In the power transmission system 3, different power transmission processing is executed during normal circumstances and during an emergency. Details of the power transmission processing by the power transmission system 3 are provided below.

The power receiver 2100 and the power transmitter 2300 include functional units similar to those of the power receiver 100 and the power transmitter 300 of the first embodiment, respectively. A detailed description of the functional units of the power receiver 2100 and the power transmitter 2300 is therefore omitted.

In the present embodiment, the communication interface 121 may transmit a power transmission request to request transmission of wireless power to the power transmitter 300.

The power transmitter 2300 may perform authentication with the power receiver 2100, and during normal circumstances, may transmit electromagnetic waves for power supply to the power receiver 2100 for which authentication was successful. During normal circumstances, this can prevent the power transmitter 2300 from supplying power to the power receiver 2100 mounted in an unintended electronic device (such as an electronic device in a neighboring house).

During an emergency, the power transmitter 2300 may transmit electromagnetic waves for power supply to the power receiver 2100 without performing authentication. The power that can be supplied by the power transmitter 2300 is thus supplied to the power receiver 2100 during an emergency regardless of the authentication relationship. In other words, the power that can be supplied by the power transmitter 2300 can be provided as a public resource during an emergency.

Authentication processing is now described. Information related to a power receiver is registered in the power transmitter 2300 for the power receiver 2100 to which the power transmitter 2300 transmits power during normal circumstances, for example. The power transmitter 2300 stores information related to a power receiver in the memory 330 for the power receiver 2100 to which the power transmitter 2300 transmits power during normal circumstances, for example. The information related to a power receiver may, for example, be identification information capable of uniquely specifying the power receiver 2100. In the present embodiment, the information related to a power receiver is described as being identification information. Information related to a power receiver is, for example, registered by being set in advance by a user. For example, the power receiver 2100 owned by the owner of the power transmitter 2300 is registered in the power transmitter 2300. During normal circumstances, power transmission processing is thus executed between the power transmitter 2300 and the power receiver 2100 owned by the same owner.

During authentication processing, the power transmitter 2300 first receives a pilot signal requesting authentication from the power receiver 2100. The power transmitter 2300 then transmits a signal requesting identification information to the power receiver 2100. When receiving the signal requesting identification information from the power transmitter 2300, the power receiver 2100 transmits a signal including the identification information of the power receiver 2100 to the power transmitter 2300. When the power transmitter 2300 acquires the signal including the identification information from the power receiver 2100, the power transmitter 2300 judges whether the power receiver 2100 is registered. The power transmitter 2300 transmits a signal providing notification of authentication success to the power receiver 2100 when judging that the power receiver 2100 is registered. The power transmitter 2300 may be configured so that, during normal circumstances, the power transmitter 2300 transmits wireless power to a power receiver 2100 that is notified of authentication success and does not transmit wireless power to a power receiver 2100 for which authentication fails.

In the present embodiment, the memory 330 may, for example, store identification information or the like of a registered power receiver 2100.

Next, power transmission processing in the power transmission system 3 according to the present embodiment is described. The power transmission system 3 according to the present embodiment executes different processing during normal circumstances and during an emergency. In the present embodiment, an emergency in the power transmission system 3 refers to when power may be transmitted from a power transmitter 2300 owned by an individual to any power receiver 2100, regardless of who owns the power receiver 2100.

An emergency may, for example, refer to when a disaster such as an earthquake has occurred. The power receiver 2100 and the power transmitter 2300 can recognize that a disaster has occurred by acquiring information related to the occurrence of a disaster from an external apparatus, for example. The power receiver 2100 and the power transmitter 2300 can recognize that a disaster has occurred by one of these devices acquiring information related to the occurrence of a disaster from an external apparatus and transmitting the acquired information to the other device. The emergency may, for example, be the case of performance of a predetermined input operation by the user of the mobile phone 2010 in which the power receiver 2100 is housed. The emergency is not limited to these examples and may be any case in which power may be transmitted from a power transmitter 2300 owned by an individual to any power receiver 2100, regardless of who owns the power receiver 2100.

The emergency may correspond to when a combination of any conditions from among the above examples is satisfied. Combining a plurality of conditions makes it easier to prevent an emergency from being mistakenly judged due to erroneous operation of the power receiver 2100 or the power transmitter 2300, for example.

When no emergency has occurred, the power receiver 2100 and the power transmitter 2300 may judge that circumstances are normal.

Figure 16:
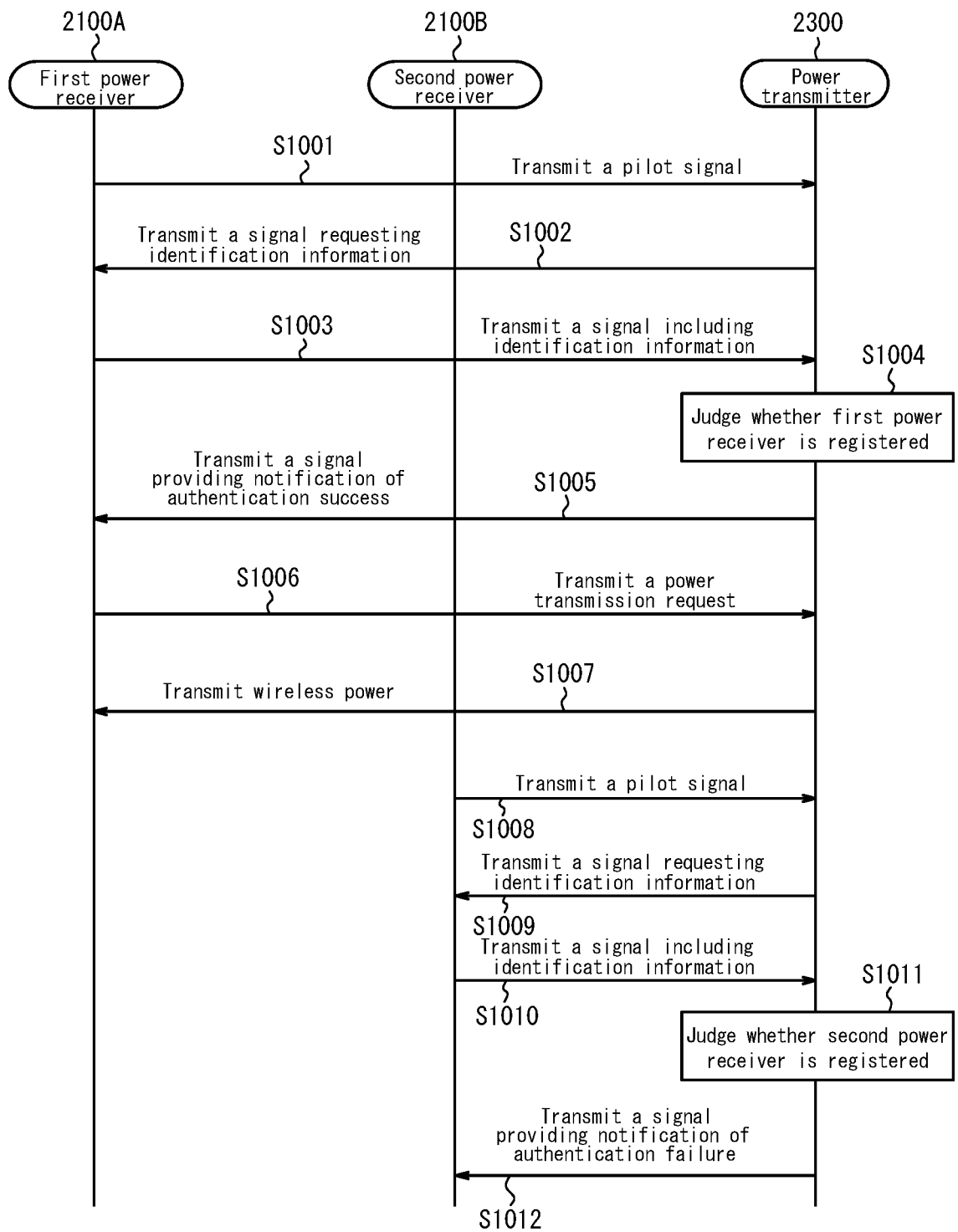
FIG. 16 is a sequence diagram illustrating an example of power transmission processing in the power transmission system of FIG. 15.

FIG. 16 is a sequence diagram illustrating an example of power transmission processing during normal circumstances. In response to a power transmission request received from a registered power receiver 2100, the power transmitter 2300 transmits wireless power to the power receiver 2100 during normal circumstances. In the processing flow of FIG. 16, an example of the first power receiver 2100A being registered in the power transmitter 2300 and the second power receiver 2100B not being registered in the power transmitter 2300 is described.

The first power receiver 2100A transmits a pilot signal requesting authentication to the power transmitter 2300 (step S1001).

In response to receipt of the pilot signal, the power transmitter 2300 transmits a signal requesting identification information to the first power receiver 2100A (step S1002).

In response to receipt of the signal requesting the identification information, the first power receiver 2100A transmits a signal including the identification information to the power transmitter 2300 (step S1003).

On the basis of the identification information received from the first power receiver 2100A, the power transmitter 2300 judges whether the first power receiver 2100A is registered in the memory 330 of the power transmitter 2300 (step S1004).

When the power transmitter 2300 judges that the first power receiver 2100A is registered in the memory 330, the power transmitter 2300 transmits a signal providing notification of authentication success to the first power receiver 2100A (step S1005).

When the first power receiver 2100A receives the signal providing notification of authentication success, the first power receiver 2100A transmits a power transmission request requesting transmission of wireless power to the power transmitter 2300 (step S1006).

In response to the power transmission request from the first power receiver 2100A, the power transmitter 2300 transmits wireless power to the first power receiver 2100A (step S1007). Wireless power is thus transmitted from the power transmitter 2300 to the registered first power receiver 2100A during normal circumstances.

The second power receiver 2100B transmits a pilot signal requesting authentication to the power transmitter 2300 (step S1008).

In response to receipt of the pilot signal, the power transmitter 2300 transmits a signal requesting identification information to the second power receiver 2100B (step S1009).

In response to receipt of the signal requesting the identification information, the second power receiver 2100B transmits a signal including the identification information to the power transmitter 2300 (step S1010).

The power transmitter 2300 judges whether the second power receiver 2100B is registered in the memory 330 of the power transmitter 2300 on the basis of the identification information received from the second power receiver 2100B (step S1011).

When the power transmitter 2300 judges that the second power receiver 2100B is not registered in the memory 330, the power transmitter 2300 transmits a signal providing notification of authentication failure to the second power receiver 2100B (step S1012). The second power receiver 2100B does not transmit the power transmission request when receiving the signal providing notification of authentication failure. Wireless power is thus not transmitted from the power transmitter 2300 to the non-registered second power receiver 2100B during normal circumstances.

The procedures for power transmission processing illustrated in FIG. 16 are only an example and need not be executed in this order. During normal circumstances, it suffices for wireless power to be transmitted from the power transmitter 2300 to the registered first power receiver 2100A and not to be transmitted from the power transmitter 2300 to the non-registered second power receiver 2100B.

In the processing flow in FIG. 16, the power receiver 2100 may, for example, transmit the identification information of the power receiver 2100 along with the pilot signal. In this case, the power transmitter 2300 judges whether the power receiver 2100 is registered in the memory 330 in response to receipt of the pilot signal including the identification information (corresponding to step S1004 or step S1011).

Figure 17:
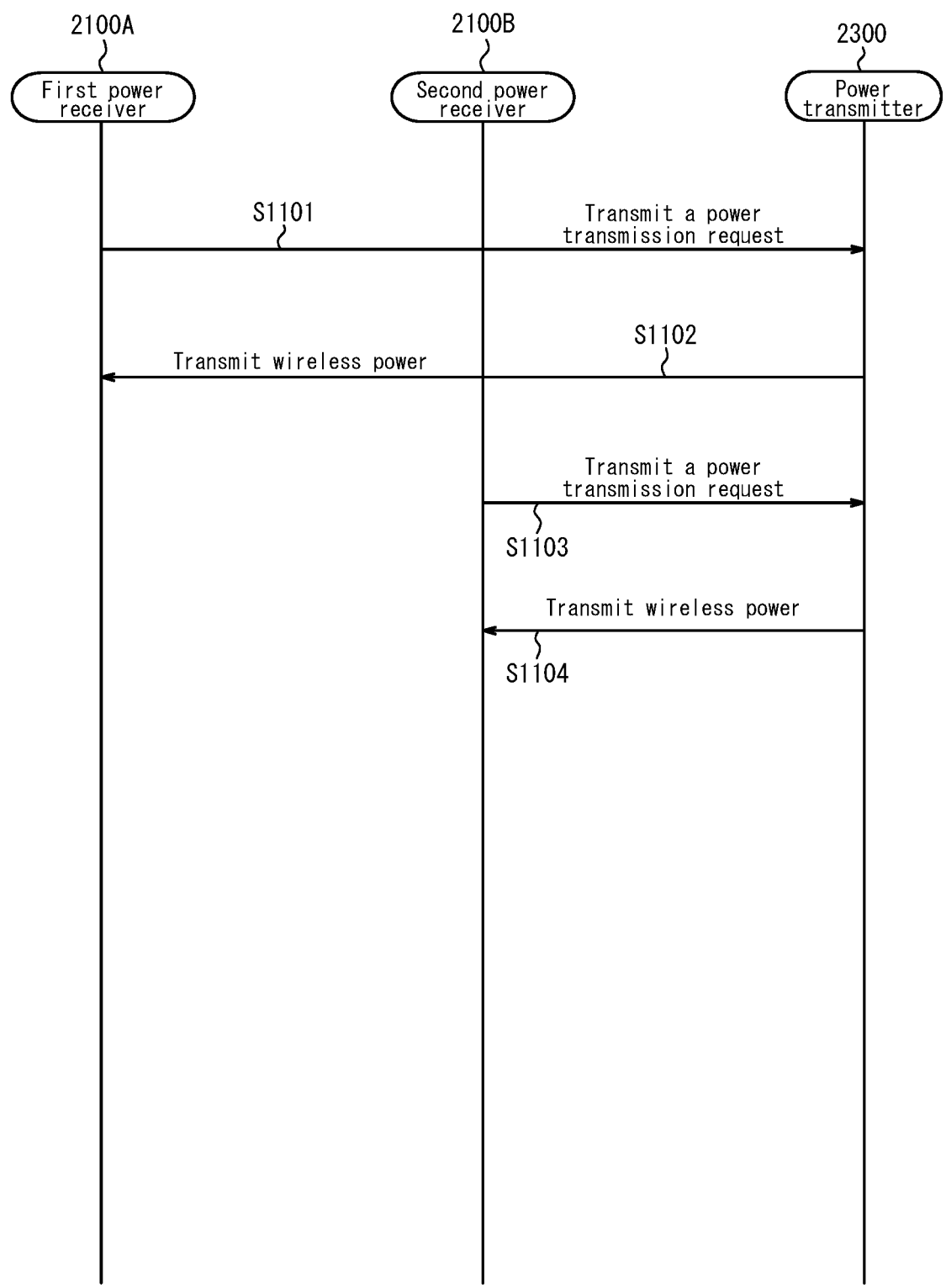
FIG. 17 is a sequence diagram illustrating an example of power transmission processing in the power transmission system of FIG. 15.

FIG. 17 is a sequence diagram illustrating an example of power transmission processing during an emergency. In response to a power transmission request received from a registered power receiver 2100 and a non-registered power receiver 2100, the power transmitter 2300 transmits wireless power to the power receivers 2100 during an emergency. As in the processing flow of FIG. 16, an example of the first power receiver 2100A being registered in the power transmitter 2300 and the second power receiver 2100B not being registered in the power transmitter 2300 is described in the processing flow of FIG. 17 as well.

The first power receiver 2100A transmits a power transmission request for wireless power during an emergency (step S1101).

In response to receipt of the power transmission request from the first power receiver 2100A, the power transmitter 2300 transmits wireless power to the first power receiver 2100A (step S1102).

The second power receiver 2100B transmits a power transmission request for wireless power during an emergency (step S1103).

In response to receipt of the power transmission request from the second power receiver 2100B, the power transmitter 2300 transmits wireless power to the second power receiver 2100B (step S1104).

Wireless power is thus transmitted from the power transmitter 2300 to both the registered first power receiver 2100A and the non-registered second power receiver 2100B during an emergency.

The procedures for power transmission processing illustrated in FIG. 17 are only an example and need not be executed in this order. If suffices for wireless power to be transmitted from the power transmitter 2300 to both the registered first power receiver 2100A and the non-registered second power receiver 2100B during an emergency.

Figure 18:
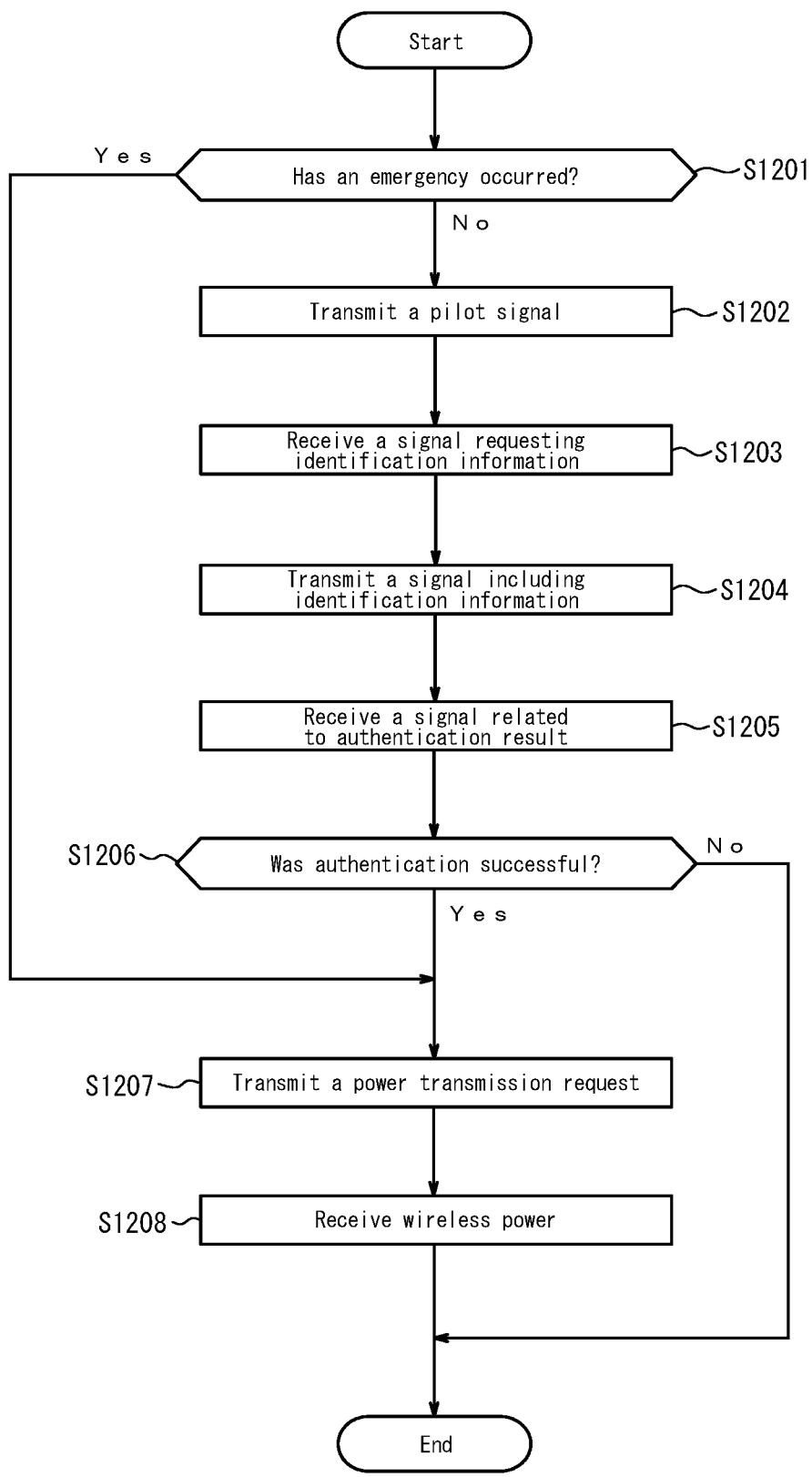
FIG. 18 is a flowchart illustrating an example of processing executed by the power receiver in FIG. 15.

Next, an example of the processing executed by the power receiver 2100 is described with reference to the flowchart in FIG. 18.

The power receiver 2100 judges whether an emergency has occurred (step S1201). An emergency is judged by the above-described methods, for example.

When the power receiver 2100 judges that an emergency has not occurred (step S1201: No), the power receiver 2100 transmits a pilot signal requesting authentication (step S1202).

The power receiver 2100 receives a signal, requesting identification information, that is transmitted from the power transmitter 2300 in response to the pilot signal (step S1203).

In response to receipt of the signal requesting the identification information, the power receiver 2100 transmits a signal including the identification information of the power receiver 2100 to the power transmitter 2300 (step S1204).

The power receiver 2100 receives a signal related to the result of authentication judged by the power transmitter 2300 in accordance with the identification information (step S1205).

The power receiver 2100 judges whether the authentication was successful on the basis of the authentication result received from the power transmitter 2300 (step S1206).

When the power receiver 2100 judges that authentication was successful (step S1206: Yes), the power receiver 2100 transmits a power transmission request requesting transmission of wireless power (step S1207).

The power receiver 2100 receives wireless power transmitted from the power transmitter 2300 in response to the power transmission request (step S1208).

When the power receiver 2100 judges, on the basis of the authentication result received from the power transmitter 2300, that authentication failed (step S1206: No), the power receiver 2100 terminates the processing flow without transmitting a power transmission request.

When the power receiver 2100 judges that an emergency has occurred (step S1201: Yes), the power receiver 2100 transmits a power transmission request without performing authentication (step S1207).

The power receiver 2100 receives wireless power transmitted from the power transmitter 2300 in response to the power transmission request (step S1208).

The power receiver 2100 may notify the user that authentication was successful by, for example, a visual method using an image, characters, light emission, or the like; an auditory method using audio or the like; or a combination of these methods. This allows the user to learn whether authentication was successful.

Next, an example of the processing executed by the power transmitter 2300 is described with reference to the flowchart in FIG. 19.

The power transmitter 2300 judges whether an emergency has occurred (step S1301). An emergency is judged by the above-described methods, for example.

When the power transmitter 2300 judges that an emergency has not occurred (step S1301: No), the power transmitter 2300 receives a pilot signal transmitted by a power receiver 2100 requesting authentication (step S1302).

In response to receipt of the pilot signal, the power transmitter 2300 transmits a signal requesting identification information to the power receiver 2100 that transmitted the pilot signal (step S1303).

The power transmitter 2300 receives a signal, including identification information, that is transmitted from the power receiver 2100 in response to the signal requesting the identification information (step S1304).

The power transmitter 2300 judges whether the power receiver 2100 corresponding to the received identification information is registered in the memory 330 on the basis of the identification information (step S1305).

When the power transmitter 2300 judges that the power receiver 2100 corresponding to the received identification information is registered in the memory 330 (step S1305: Yes), the power transmitter 2300 transmits a signal providing notification of authentication success to the power receiver 2100 (step S1306).

The power transmitter 2300 receives a power transmission request from the power receiver 2100 that was notified of authentication success (step S1307).

In response to receipt of the power transmission request from the power receiver 2100 that was notified of authentication success, the power transmitter 2300 transmits wireless power to the power receiver 2100 (step S1308).

When the power transmitter 2300 judges that the power receiver 2100 corresponding to the received identification information is not registered in the memory 330 (step S1305: No), the power transmitter 2300 transmits a signal providing notification of authentication failure to the power receiver 2100 (step S1309). The processing flow terminates in this case.

When the power transmitter 2300 judges that an emergency has occurred (step S1301: Yes), the power transmitter 2300 receives a power transmission request from the power receiver 2100 (step S1307).

In response to receipt of the power transmission request from the power receiver 2100, the power transmitter 2300 transmits wireless power to the power receiver 2100 (step S1308).

During normal circumstances, the power transmitter 2300 in the power transmission system 3 according to the present embodiment thus transmits wireless power to a power receiver 2100 for which authentication succeeds and does not transmit wireless power to a power receiver 2100 for which authentication fails. During an emergency, the power transmitter 2300 transmits wireless power to the power receiver 2100 regardless of whether the identification information is registered. The power transmission system 3 can thus prevent power from being supplied during normal circumstances to a power receiver 2100 mounted in an unintended electronic device. During an emergency, the power transmission system 3 can supply wireless power to the power receiver 2100 regardless of the authentication relationship. Hence, even if an electronic device housing a power receiver 2100 is not located within the power transmission range of a power transmitter 2300 with which the power receiver 2100 has an authentication relationship, the power receiver 2100 is still supplied power during a disaster or other emergency. Consequently, power can continue to be supplied to the electronic device, allowing the user to continue using the electronic device. The power transmission system 3 can thus be more useful.

Although the present disclosure is based on embodiments and drawings, it is to be noted that various changes and modifications will be apparent to those skilled in the art based on the present disclosure. Therefore, such changes and modifications are to be understood as included within the scope of the present disclosure. For example, the functions and the like included in the various components may be reordered in any logically consistent way. Furthermore, components may be combined into one or divided.

What is claimed is:

1. A device comprising:
a power reception interface configured to receive wireless power; and
a controller configured to
acquire information from an external apparatus related to an occurrence of a disaster outside of the device,
determine an emergency based on the information related to the occurrence of the disaster, and
during the emergency, control the power reception interface to receive wireless power from outside of the device and use the received wireless power to power the controller.

2. The device of claim 1, wherein
the controller is further configured control the device to transmit an emergency power transmission request for the wireless power to power the device during the emergency.

3. The device of claim 1, wherein
the controller is further configured to determine the emergency based on a property of the device.

4. The device of claim 3, wherein
the property of the device includes the device not being able to receive the wireless power from a power transmitter configured to transmit wireless power to the device.

5. The device of claim 1, wherein
the controller is further configured to control the device to transmit information related to priority of power reception by the device during the emergency.

6. A device comprising:
a controller configured to
determine an emergency based on information received from outside of the device related to a disaster outside of the device, and
during the emergency, control the device to receive wireless power from outside of the device and use the received wireless power to power the controller.

7. The device of claim 6, wherein
the controller is further configured to control the device to transmit an emergency power transmission request for the wireless power to power the device during the emergency.

8. The device of claim 6, wherein
the controller is further configured to determine the emergency based on a property of the device.

9. The device of claim 8, wherein
the property of the device includes the device not being able to receive the wireless power from a power transmitter configured to transmit wireless power to the device.

10. The device of claim 6, wherein
the controller is further configured to control the device to transmit information related to priority of power reception by the device during the emergency.

11. A method for controlling a device, comprising:
determining, by a processor in the device, an emergency based on information received from outside of the device related to a disaster outside of the device; and
during the emergency, controlling the device to receive wireless power from outside of the device and use the received wireless power to power the processor.

12. The method of claim 11, further comprising:
controlling the device to transmit an emergency power transmission request for the wireless power to power the device during the emergency.

13. The method of claim 11, wherein
the determining includes determining the emergency based on a property of the device.

14. The method of claim 13, wherein
the property of the device includes the device not being able to receive the wireless power from a power transmitter configured to transmit wireless power to the device.

15. The method of claim 11, further comprising:
controlling the device to transmit information related to priority of power reception by the device during the emergency.

16. The device of claim 1, further comprising:
a case,
wherein the power reception interface and the controller are in the case.

17. The device of claim 6, further comprising:
a case,
wherein the controller is in the case.

18. The method of claim 11, wherein
the device includes a case, and the processor is in the case.

* * * * *